(12) United States Patent
Matsuyama et al.

(10) Patent No.: US 11,716,431 B2
(45) Date of Patent: Aug. 1, 2023

(54) IMAGE READING DEVICE

(71) Applicant: SEIKO EPSON CORPORATION, Tokyo (JP)

(72) Inventors: Koya Matsuyama, Kitakyushu (JP); Masahiko Mizoguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/045,880

(22) Filed: Oct. 12, 2022

(65) Prior Publication Data
US 2023/0112819 A1 Apr. 13, 2023

(30) Foreign Application Priority Data
Oct. 12, 2021 (JP) .................. 2021-167240

(51) Int. Cl.
G06K 15/00 (2006.01)
H04N 1/00 (2006.01)

(52) U.S. Cl.
CPC ....... *H04N 1/00774* (2013.01); *H04N 1/0057* (2013.01); *H04N 1/00562* (2013.01); *H04N 1/00726* (2013.01); *H04N 1/00771* (2013.01); *H04N 1/00801* (2013.01)

(58) Field of Classification Search
CPC .......... H04N 1/00774; H04N 1/00562; H04N 1/0057; H04N 1/00726; H04N 1/00771; H04N 1/00801
See application file for complete search history.

(56) References Cited

U.S. PATENT DOCUMENTS

2012/0248686 A1* 10/2012 Kawauchi .............. B65H 3/063
271/248

FOREIGN PATENT DOCUMENTS

JP 2012246098 A 12/2012

* cited by examiner

*Primary Examiner* — Moustapha Diaby
(74) *Attorney, Agent, or Firm* — Chip Law Group

(57) ABSTRACT

When a device main body acquires detection information corresponding to a second original document from a rigidity detecting unit in a state where the device main body is in a first posture, a control unit of an image reading device performs a first step of stopping transporting an original document and a second step of controlling a driving source to switch the posture of the device main body from a first posture to a second posture in which a sloped angle of the device main body is smaller than that in the first posture.

9 Claims, 17 Drawing Sheets

IMAGE READING DEVICE

The present application is based on, and claims priority from JP Application Serial Number 2021-167240, filed on Oct. 12, 2021, the disclosure of which is hereby incorporated by reference herein in its entirety.

BACKGROUND

1. Technical Field

The present disclosure relates to an image reading device that reads an image on a medium.

2. Related Art

There is a sheet feeding type scanner serving as one example of an image reading device. The term "scanner" used below represents a sheet feeding type scanner. In some cases, in order to reduce the footprint, a scanner may employ a configuration in which a transport path used to transport a sheet is largely sloped relative to the horizontal plane, and a U-turn is performed to the sheet to discharge it obliquely upward, as with a scanner described in JP-A-2012-246098.

In addition, in a case of the scanner described in JP-A-2012-246098, part of the transport path having a U-shape is opened to be able to switch the transport path from the U-turn path into the straight path. By switching the transport path from the U-turn path into the straight path, it is possible to favorably discharge a sheet having a large thickness, which is less easily bend, for example.

With the scanner described in JP-A-2012-246098, the transport path can be switched from the U-turn path into the straight path. However, the straight path is largely sloped relative to the horizontal path, and the lower-side space of the U-shaped transport path is narrow. Thus, when the straight path is used, it is possible to discharge a sheet having higher rigidity as compared with when the U-turn path is used. However, it is difficult to discharge an original document having high rigidity and a large size.

In addition, when a sheet having a great thickness, which is less easily bent, is transported in a state where the transport path is set to the U-turn path, this possibly leads to a jam of an original document or breakage of the device.

SUMMARY

In order to solve the problem described above, an image reading device according to the present disclosure includes a main-body support portion mounted at a mounting surface of the device, and a device main body supported at the main-body support portion, in which the device main body includes a reading transport path that is an original-document transport path configured to transport an original document and is opposed to a reading unit configured to read the original document, a rigidity detecting unit configured to detect information relating to rigidity of the original document, and a control unit configured to control the device on a basis of detection information from the rigidity detecting unit, the device main body is attached rotatably relative to the main-body support portion and is configured to rotate by power of a driving source to switch a posture of the device main body, the device main body is configured to switch between a first posture and a second posture, the first posture being a posture in which a first original document is discharged, the second posture being a posture in which an angle formed by the reading transport path and the mounting surface is smaller than that in the first posture, the second posture being a posture in which a second original document having rigidity higher than the first original document is discharged, and when the device main body acquires detection information corresponding to the second original document from the rigidity detecting unit in a state where the device main body is in the first posture, the control unit performs a first step of stopping transporting the original document and a second step of controlling the driving source to switch the posture of the device main body from the first posture to the second posture.

DESCRIPTION OF EXEMPLARY EMBODIMENTS

Figure 1:
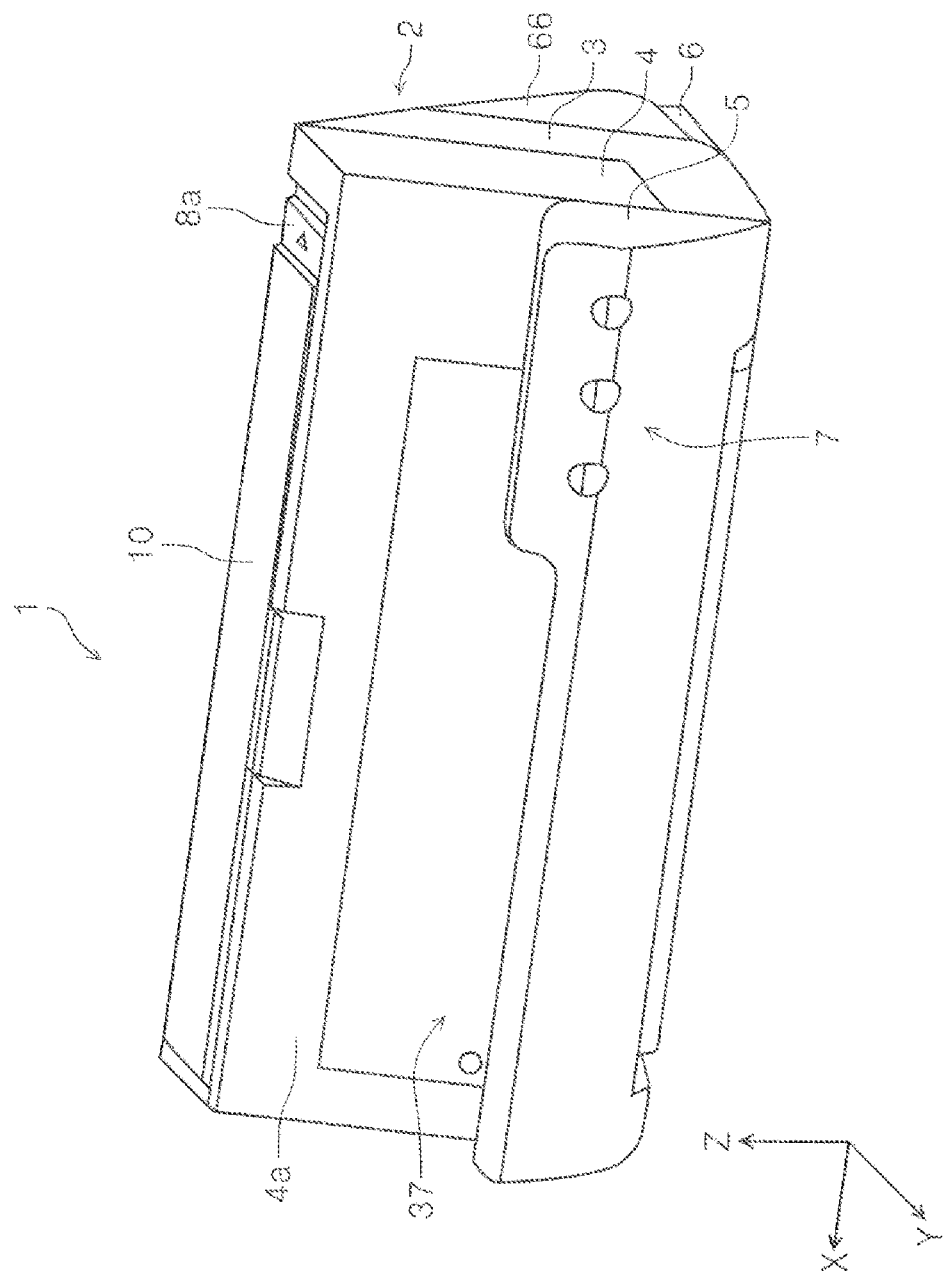
FIG. 1 is a perspective view illustrating the scanner as viewed from the front, the scanner including a device main body in a standard reading posture.

Below, the present disclosure will be schematically described.

An image reading device according to a first aspect includes: a main-body support portion mounted at a mounting surface of the device; and a device main body supported at the main-body support portion, in which the device main body includes: a reading transport path that is an original-document transport path configured to transport an original document and is opposed to a reading unit configured to read the original document; a rigidity detecting unit configured to detect information relating to rigidity of the original document; and a control unit configured to control the device on the basis of detection information from the rigidity detecting unit, the device main body is attached rotatably relative to the main-body support portion and is configured to rotate by power of a driving source to switch a posture of the device main body, the device main body is configured to is able to switch between a first posture and a second posture, the first posture being a posture in which a first original document is discharged, the second posture being a posture in which an angle formed by the reading transport path and the mounting surface is smaller than that in the first posture, the second posture being a posture in which a second original document having rigidity higher than the first original document is discharged, and when the device main body acquires detect information corresponding to the second original document from the rigidity detecting unit in a state where the device main body is in the first posture, the control unit performs a first step of stopping transporting the original document and a second step of controlling the driving source to switch the posture of the device main body from the first posture to the second posture.

With the present aspect, by setting the device main body into the second posture, it is possible to make the angle formed by the reading transport path and the mounting surface smaller than that in the first posture. This makes it possible to set the direction in which the original document is discharged, to be a direction along the mounting surface, as compared with the first posture. Thus, in the second posture, it is possible to appropriately discharge the original document that is less easily bent. Note that, by setting the device main body into the first posture, it is possible to make the angle formed by the reading transport path and the mounting surface greater than that in the second posture. This makes it possible to reduce the footprint of the device main body.

In addition, when the device main body acquires detection information corresponding to the second original document from the rigidity detecting unit in a state where the device main body is in the first posture, the control unit performs the first step of stopping transporting the original document and the second step of controlling the driving source to switch the posture of the device main body from the first posture to the second posture. Thus, it is possible to prevent a jam of the original document or breakage of the device in association with transporting, in the first posture, the second original document that is not suitable to be transported in the first posture.

In addition, the posture of the device main body is automatically switched into an appropriate posture, which makes it possible to improve usability.

In the first aspect, a second aspect is configured such that the device main body includes a reverse transport path and a non-reverse transport path, the reverse transport path being an original-document transport path disposed downstream of the reading transport path and used when the read original document is reversed to face upward and is discharged, the non-reverse transport path being an original-document transport path disposed downstream of the reading transport path and used when the read original document is discharged without being reversed, and the reading transport path is coupled to the reverse transport path when the device main body takes the first posture, and is coupled to the non-reverse transport path when the device main body takes the second posture.

With the present aspect, the reverse transport path is configured as a transport path used to reverse upward the original document that has been read and discharge it. This makes it possible to reduce a space necessary to discharge the original document. In addition, the non-reverse transport path is configured as a transport path used to discharge the original document that has been read without being reversed. This makes it possible to appropriately discharge the second original document, that is, the original document that is less easily bent.

In the first or second aspect, a third aspect is configured such that, after performing the first step, the control unit performs a returning operation to return the original document upstream.

When transporting the original document is stopped and transporting the original document is resumed from this state, there is a possibility that the velocity at which the original document is transported does not reach an appropriate velocity at the reading position. This may lead to a deterioration in quality of reading. With the present aspect, however, the control unit performs the first step and then performs the returning operation to return the original document upstream. This makes it possible to easily achieve an appropriate velocity at which the original document is transported, at the reading position.

In the third aspect, a fourth aspect is configured such that the device main body includes an original-document detecting unit disposed upstream of a detection position by the detecting unit in an original-document transport path and configured to detect the original document, in which the control unit returns, during the returning operation, the original document to a position where the original-document detecting unit does not detect the original document.

With the present aspect, the control unit is configured to return, during the returning operation, the original document to a position where the original-document detecting unit does not detect the original document. This makes it possible to reliably return the original document to an appropriate position.

In the third or fourth aspect, a fifth aspect is configured such that the control unit performs the second step and the returning operation in parallel.

With the present aspect, the control unit performs the second step and the returning operation in parallel. This makes it possible to reduce the period of time until transporting the original document is resumed.

In the first or second aspect, a sixth aspect is configured such that, after performing the second step, the control unit performs an operation of re-feeding the original document.

With the present aspect, the control unit performs the second step and then performs the operation of re-feeding the original document. This eliminates the need for a user to perform an operation of re-setting the original document, which makes it possible to improve usability.

In the first or second aspect, a seventh aspect is configured such that, after performing the second step, the control unit performs an operation of discharging the original document.

When the original document is returned upstream, a jam may occur. With the present aspect, however, the control unit performs the second step and then performs the operation of discharging the original document. This makes it possible to avoid occurrence of a jam associated with returning the original document upstream.

In any one of the first to seventh aspects, an eighth aspect is configured such that, when the device main body is in the second posture, the control unit does not use detection information from the rigidity detecting unit.

With the present aspect, when the device main body is in the second posture, the control unit does not use the detection information from the rigidity detecting unit. This makes it possible to achieve simplified control.

In any one of the first to eighth aspects, a ninth aspect is configured to include a display unit configured to display various types of information, in which, before performing the second step, the control unit causes the display unit to perform display indicating that the posture of the device main body is to be switched.

The present aspect includes the display unit configured to display various types of information, and before performing the second step, the control unit causes the display unit to perform display indicating that the posture of the device main body is to be switched. This makes it possible to attract user's attention on switching of a posture of the device main body.

Below, the present disclosure will be specifically described.

In the following description, a scanner 1 will be given as an example of an image reading device, by way of example. The scanner 1 is able to read at least one surface of a first surface of an original document and a second surface that is opposite to the first surface. The scanner 1 is a so-called sheet feeding type scanner that performs reading while moving the original document relative to a reading unit that will be described later.

In the present specification, the original document includes not only a sheet-shaped original document but also a card-shaped original document and a booklet-shape original document.

Note that the X-Y-Z coordinate system illustrated in each of the drawings is set such that the X-axis direction is a width direction of the device and also is a width direction of the original document. The Y-axis direction is a depth direction of the device. The Z-axis direction is a direction along the vertical direction. In the present embodiment, the +Y direction is a direction from the back face of the device toward the front face, and the −Y direction is a direction from the front face of the device toward the back face. In addition, the +X direction is a left direction as viewed from the front face of the device, and −X direction is a right direction.

Furthermore, in the description below, a direction in which the original document is conveyed may be referred to as "downstream", and a direction opposite to this direction may be referred to as "upstream".

Figure 2:
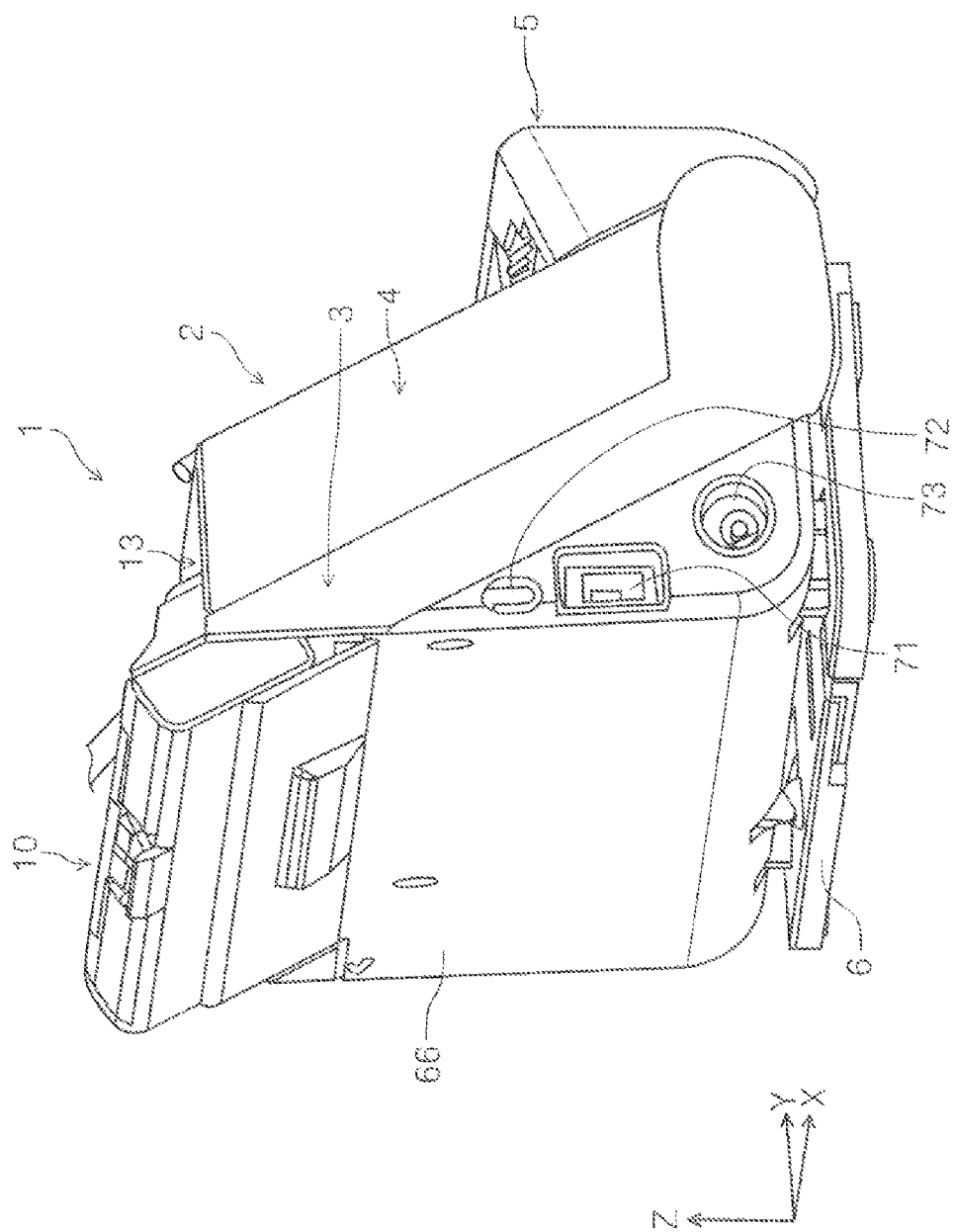
FIG. 2 is a perspective view illustrating the scanner as viewed from the rear, the scanner including the device main body in the standard reading posture.

In FIGS. 1 and 2, the scanner 1 includes a device main body 2, and a main-body support portion 6 configured to rotatably support the device main body 2.

The device main body 2 is configured to include a first unit 3, a second unit 4, and a third unit 5.

Figure 3:
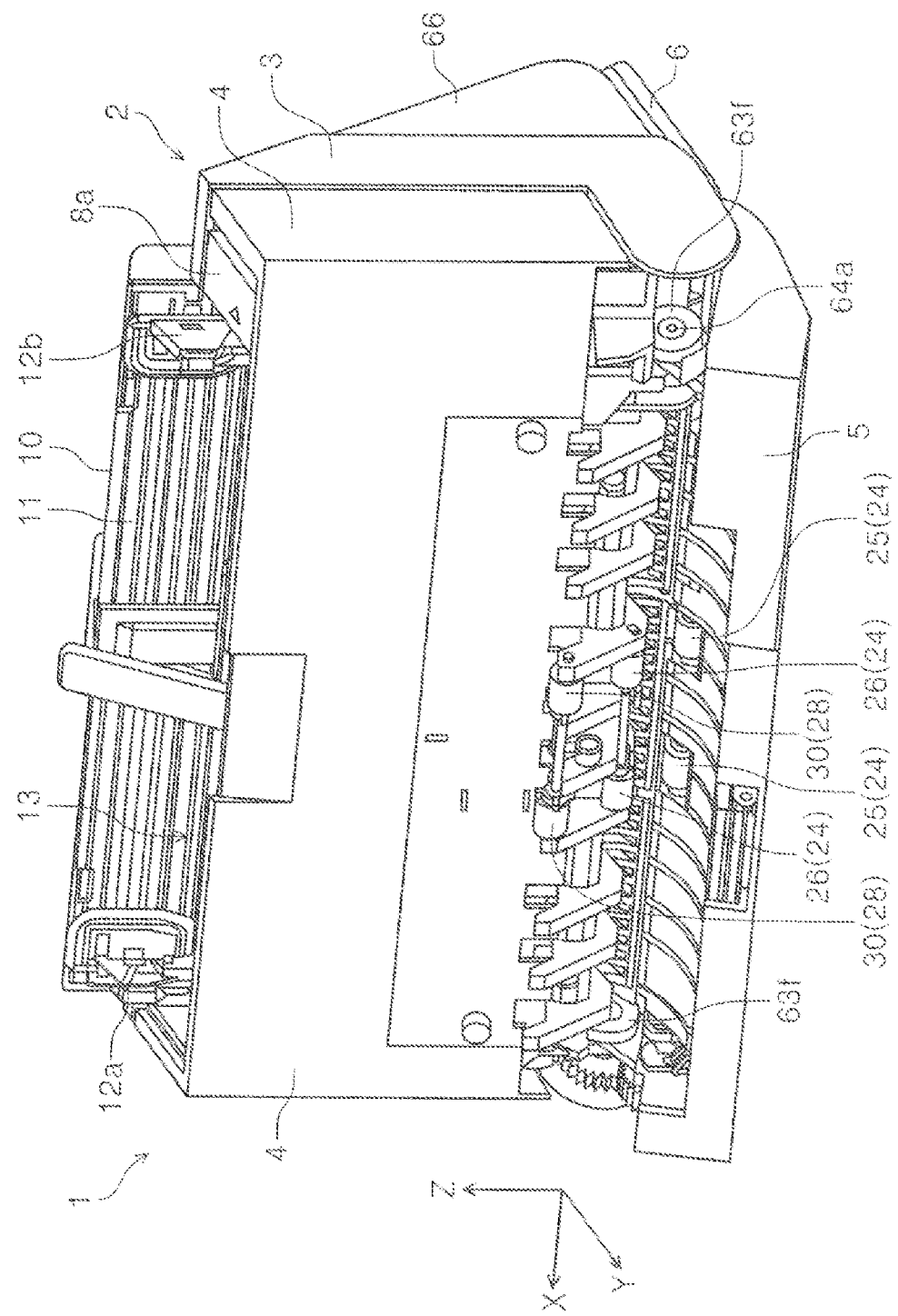
FIG. 3 is a perspective view illustrating the scanner as viewed from the front, in which the device main body is in the standard reading posture and a third unit is opened.

The second unit 4 and the third unit 5 are provided so as to be able to rotate with a frame rotary shaft 64a being the center (see FIG. 3). The frame rotary shaft 64a is a rotary shaft that constitutes the rotary shaft center parallel to the X-axis direction, and is pivotally supported by a bearing portion 63f formed at a first frame 63. The first frame 63 is a frame that constitutes a base body of the first unit 3.

Figure 4:
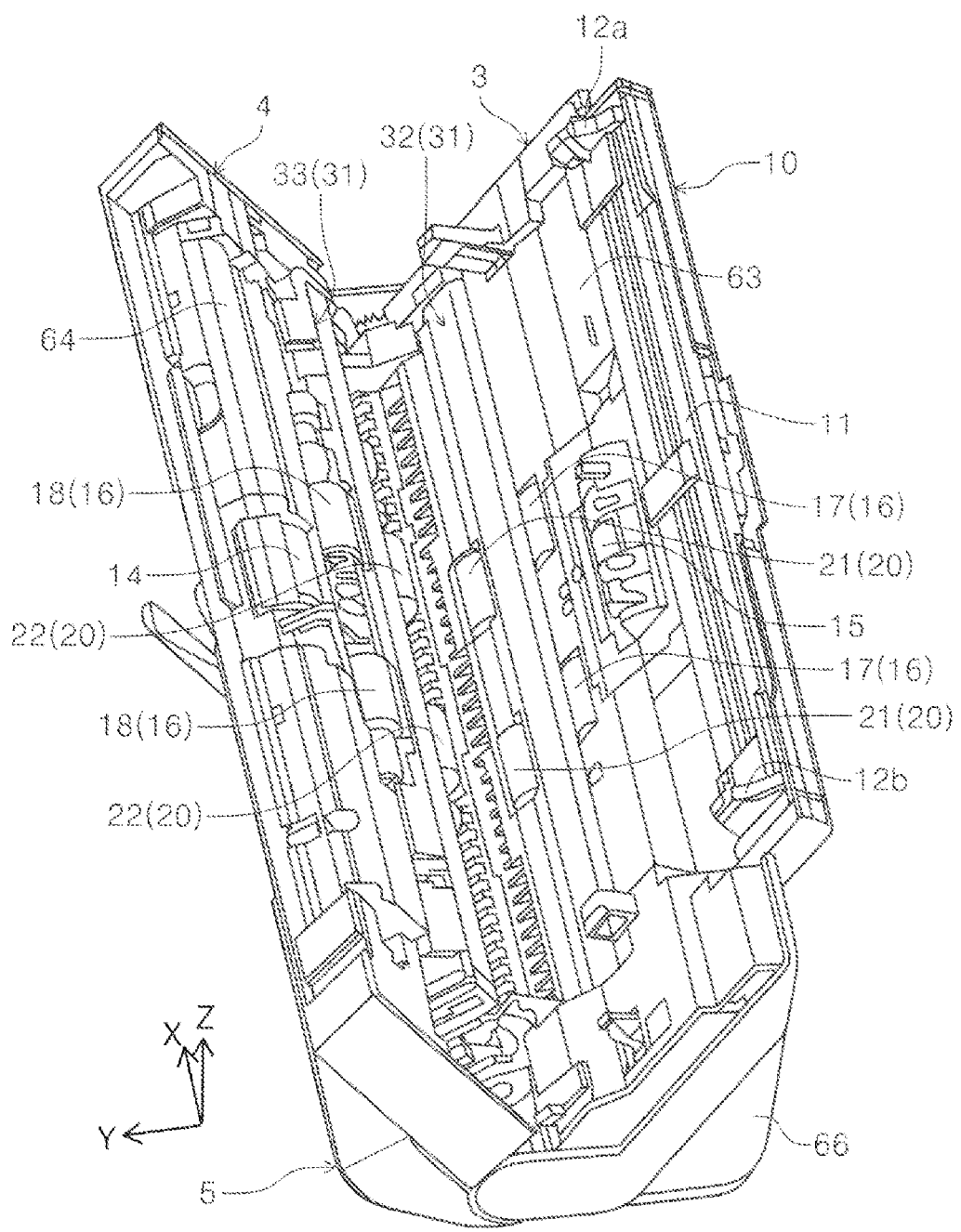
FIG. 4 is a perspective view illustrating the scanner as viewed from above, in which the device main body is in the standard reading posture and a second unit is opened.

The second unit 4 and the third unit 5 are able to integrally rotate relative to the first unit 3 with the frame rotary shaft 64a being the center (see FIG. 4). The reference character 8a represents a lock release portion. By sliding the lock release portion 8a in the −X direction, a user can release the lock of the second unit 4 and the third unit 5 relative to the first unit 3. In addition, by rotating the second unit 4 and the third unit 5 relative to the first unit 3, it is possible to expose part of the original-document transport path as illustrated in FIG. 4. In particular, it is possible to expose an original-document feeding path R1 and a reading conveying path R2 that will be described later.

In addition, the third unit 5 is able to rotate relative to the first unit 3 and the second unit 4 with the frame rotary shaft 64a being the center (see FIG. 3). By causing the third unit 5 to rotate relative to the first unit 3 and the second unit 4, it is possible to expose part of the original-document conveying path as illustrated in FIG. 3. In particular, it is possible to expose a reverse conveying path R3 that will be described later.

Figure 5:
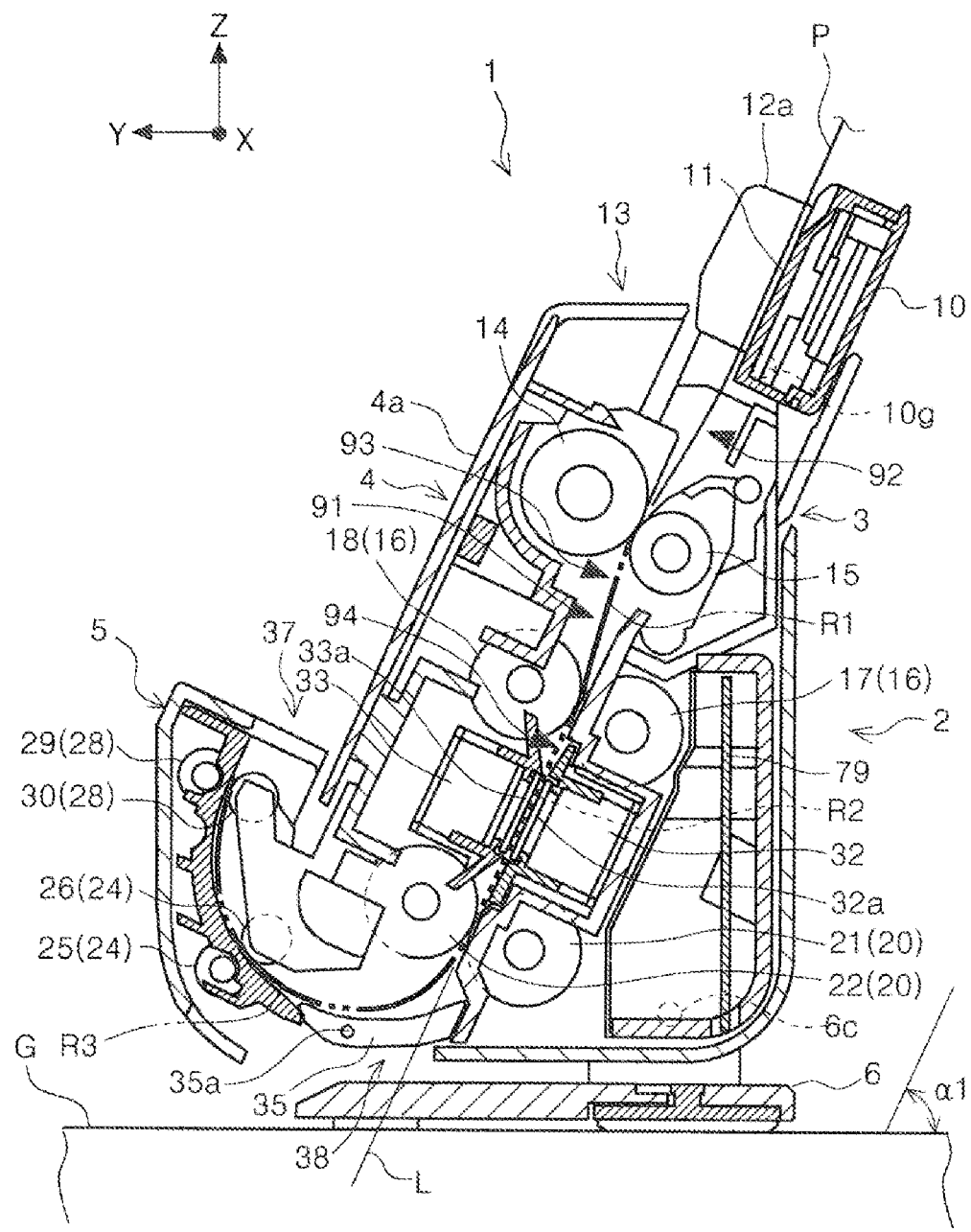
FIG. 5 is a cross-sectional view illustrating an original-document conveying path of the scanner as viewed in a width direction, the scanner including the device main body in the standard reading posture.
Figure 6:
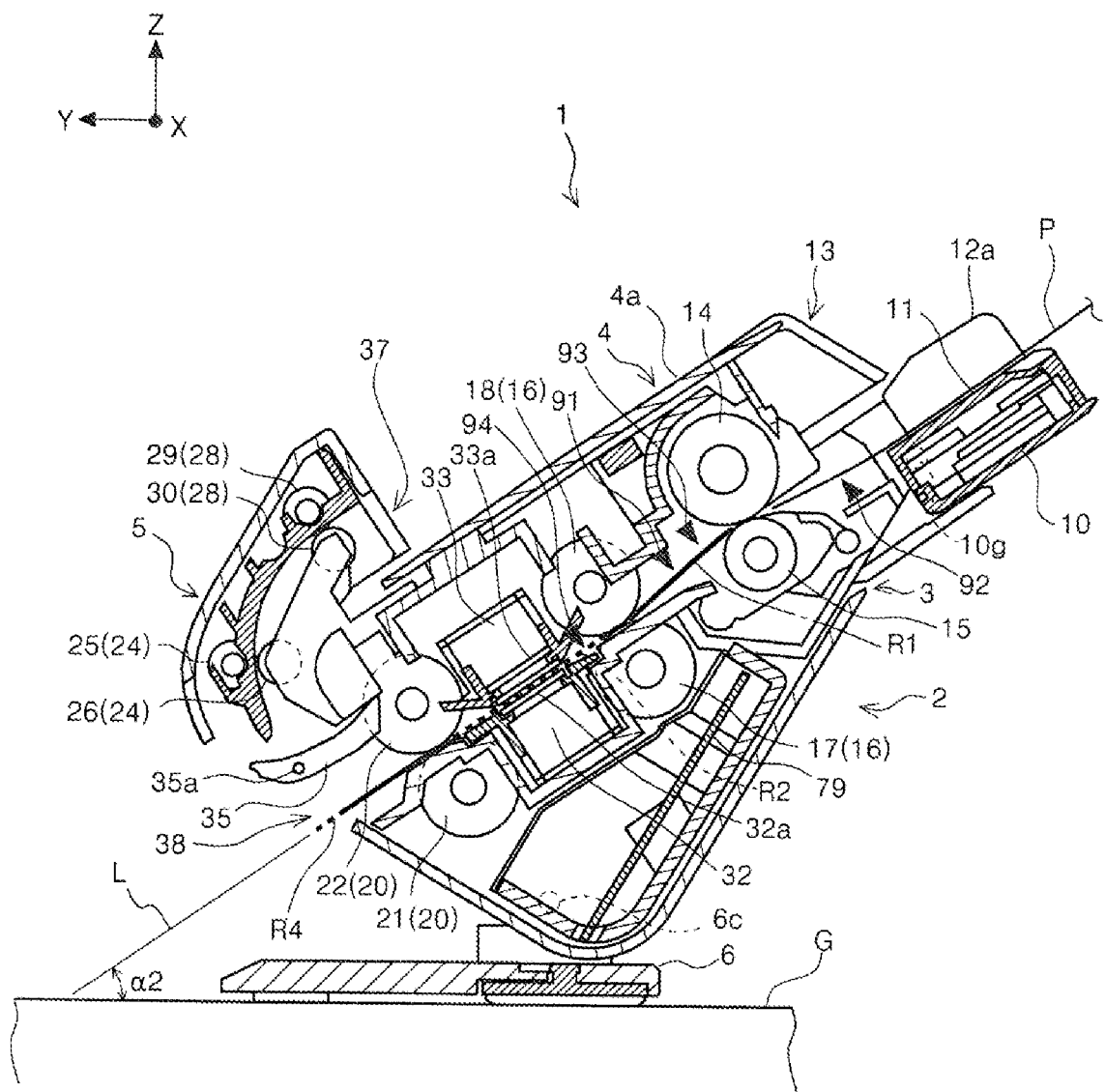
FIG. 6 is a cross-sectional view illustrating the original-document conveying path of the scanner as viewed in a width direction, the scanner including the device main body in a booklet reading posture.

The device main body 2 is able to rotate relative to the main-body support portion 6 with a main-body rotary shaft 6c (see FIGS. 7 and 8) being the center. In the present embodiment, the device main body 2 rotates, thereby being able to maintain two postures. The two postures of the device main body 2 are illustrated in FIGS. 5 and 6. Hereinafter, the posture in FIG. 5 is referred to as a standard reading posture, and the posture in FIG. 6 is referred to as a booklet reading posture. The standard reading posture is one example of the first posture of the device main body 2. The booklet reading posture is one example of the second posture of the device main body 2.

Although detailed description will be made later, the first posture of the device main body 2 is a posture in which the reading transport path R2 is coupled to the reverse transport path R3 with a flap 35 (transport-path switching means). In addition, the second posture of the device main body 2 is a posture in which the reading transport path R2 is coupled to the non-reverse transport path R4 with the flap 35 (transport-path switching means).

The angle $\alpha 1$ illustrated in FIG. 5 and the angle $\alpha 2$ illustrated in FIG. 6 are angles formed by a reading conveying path R2 and a mounting surface G for the device, each of which will be described later. The angle $\alpha 2$ in a case of the booklet reading posture is smaller than the angle $\alpha 1$ in a case of the standard reading posture.

In the standard reading posture, the projected area of the device main body 2 onto the mounting surface G where the scanner 1 is mounted is the smallest. In other words, the standard reading posture is a posture in which the footprint of the device main body 2 is the smallest.

Note that the footprint as used herein means an area that the device main body 2 takes up on the X-Y plane when the device main body 2 is viewed from above.

The standard reading posture is suitable for a sheet-shaped original document, in other words, is suitable to read an original document that has a reduced rigidity and is easily bent. The booklet reading posture is suitable to read a plastic card, a booklet or other original document that have high rigidity and is less likely to be bent.

An operation unit 7 comprised of a plurality of operation buttons including a power button is provided at the front face of the device.

In addition, of side surfaces that constitute the periphery of the device, a side surface at the +X direction includes a first connection unit 71, a second connection unit 72, and a third connection unit 73, as illustrated in FIG. 2. The first connection unit 71 is a connection unit to which a plug (not illustrated) with USB Type-A serving as one example of the target of coupling is coupled. The second connection unit 72 is a connection unit to which a plug (not illustrated) with USB Type-C serving as one example of the target of coupling is coupled. The third connection unit 73 is a connection unit to which a power supply plug (not illustrated) used to supply electric power to the device main body 2 is coupled.

Note that the "USB" stands for a universal serial bus, and each of the Type-A and the Type-C is one of a plurality of types defined in the USB standard.

The first connection unit 71 is able to be coupled to an external device through a USB cable (not illustrated), and is also able to be coupled to a storage medium such as a USB memory (not illustrated). In addition, a control section 80 (see FIG. 12) is able to store read data in a storage medium coupled to the first connection unit 71.

Furthermore, an external device is able to be coupled to the second connection unit 72 through a USB cable (not illustrated).

The first connection unit 71, the second connection unit 72, and the third connection unit 73 are provided at a printed wired board 79 (see FIG. 7) disposed at a back face side of the device.

Note that, in the present embodiment, the device main body 2 is configured so as to be able to receive supply of electrical power from an external device coupled to the second connection unit 72.

Next, description will be made of the configuration of the original-document conveying path in the scanner 1 with reference to FIGS. 5 and 6. The original document to be fed is supported by an original-document support portion 11 in a sloped posture. The reference letter "P" represents an original document that is supported. When a plurality of original documents are supported by the original-document support portion 11, the uppermost original document is sent out downstream by a feed roller 14. The original-document support portion 11 is formed at an upper opening/closing section 10. The upper opening/closing section 10 is able to rotate with a not-illustrated rotary shaft being the center, and rotate to open and close a feed port 13. FIG. 1 illustrates a state in which the upper opening/closing section 10 is closed. FIG. 2 illustrates a state in which the upper opening/closing section 10 is opened. The upper opening/closing section 10 constitutes the first unit 3.

A pair of edge guides 12a and 12b configured to guide side edges of the original document are provided at the original-document support portion 11 as illustrated in FIG. 3. The pair of edge guides 12a and 12b are provided so as to be able to slide in the width direction (X-axis direction) of the original document. The pair of edge guides 12a and 12b are provided so as to work in a linked manner with a rack and pinion mechanism that is not illustrated in a manner such that they are spaced apart from each other or are brought closer to each other with the center position of the original document in the width direction being interposed therebetween. In other words, the scanner 1 employs a so-called center feed system.

With reference to FIGS. 5 and 6 again, the feed roller 14 is provided at the second unit 4. The feed roller 14 receives power from a transport motor 50 (see FIG. 7) to rotate. A separation roller 15 is provided at a position in the first unit 3 that is opposed to the feed roller 14. Rotational torque is applied to the separation roller 15 by a torque limiter that is not illustrated, to prevent multiple original documents from being fed at one time.

The feed roller 14 and the separation roller 15 are provided at the center position in the width direction of the original document (see FIG. 4).

The separation roller 15 and a torque limiter, which is not illustrated, are configured to be able to be coupled through a toothed gear that is not illustrated. In addition, the toothed gear, which is not illustrated, is displaced with a second solenoid 95 (see FIG. 12) This makes it possible to switch between a state in which the separation roller 15 and the torque limiter are coupled to each other, that is, a separation state of separating the original document and a state in which the separation roller 15 and the torque limiter are not coupled to each other, that is, a non-separation state of not separating the original document. Furthermore, the control section 80 (see FIG. 12) configured to control the second solenoid 95 controls the second solenoid 95 so as to achieve the separation state when the device main body 2 is in the standard reading posture and to achieve the non-separation state when the device main body 2 is in the booklet reading posture.

A first transport roller pair 16 is provided downstream of the feed roller 14 and the separation roller 15. The first transport roller pair 16 is comprised of a first lower roller 17 provided in the first unit 3 and a first upper roller 18 provided in the second unit 4. The first upper roller 18 is provided so as to be able to advance or retreat relative to the first lower roller 17, and is pressed toward the first lower roller 17 by a not-illustrated pressing member such as a coil spring.

The first lower roller 17 and the first upper roller 18 receive power from a transport motor 50, which will be described later, to rotate. The first lower roller 17 and the first upper roller 18 are provided such that the number of each of these rollers is two, and these two rollers are provided with the center position of the original document in the width direction being interposed between them (see FIG. 4).

When the second unit 4 is closed relative to the first unit 3, the first lower roller 17 and the first upper roller 18 are brought into contact with each other. When the second unit 4 is opened relative to the first unit 3, the first upper roller 18 is spaced apart from the first lower roller 17.

A first reading unit 32 and a second reading unit 33 are provided downstream of the first transport roller pair 16 so as to be opposed to each other. The first reading unit 32 is provided in the first unit 3. The second reading unit 33 is provided in the second unit 4. The first reading unit 32 reads a lower surface (first surface) of the original document supported by the original-document support portion 11. The second reading unit 33 reads an upper surface (second surface) of the original document supported by the original-document support portion 11. The second reading unit 33 is provided so as to be able to advance or retreat relative to the first reading unit 32, and is pressed toward the first reading unit 32 by a not-illustrated pressing member such as a coil spring.

In the present embodiment, the first reading unit 32 and the second reading unit 33 are comprised of a contact image sensor module (CISM). The reference character "32a" represents a contact glass that constitutes the first reading unit 32. The reference character "33a" represents a contact glass that constitutes the second reading unit 33.

A second transport roller pair 20 is provided downstream of the first reading unit 32 and the second reading unit 33. The second transport roller pair 20 is comprised of a second lower roller 21 provided in the first unit 3 and a second upper roller 22 provided in the second unit 4. The second upper roller 22 is provided so as to be able to advance or retreat relative to the second lower roller 21, and is pressed toward the second lower roller 21 by a not-illustrated pressing member such as a coil spring.

The second lower roller 21 and the second upper roller 22 receive power from the transport motor 50, which will be described later, to rotate. The second lower roller 21 and the second upper roller 22 are provided such that the number of each of these rollers is two, and these two rollers are provided with the center position of the original document in the width direction being interposed between them (see FIG. 4).

When the second unit 4 is closed relative to the first unit 3, the second lower roller 21 and the second upper roller 22 are brought into contact with each other. When the second unit 4 is opened relative to the first unit 3, the second upper roller 22 is spaced apart from the second lower roller 21.

The long dashed short dashed line indicated by the reference character R1 in FIGS. 5 and 6 indicates the original-document feeding path. The original-document feeding path R1 extends from the nipping position of the feed roller 14 and the separation roller 15 to the nipping position of the first transport roller pair 16. In addition, the dashed line indicated by the reference character R2 in FIGS. 5 and 6 indicates the reading conveying path. The reading conveying path R2 extends from the nipping position of the first transport roller pair 16 to the nipping position of the second transport roller pair 20. The reading conveying path R2 is an original-document conveying path that is opposed to the first reading unit 32 and the second reading unit 33.

When the device main body 2 is in the standard reading posture illustrated in FIG. 5, the reverse conveying path R3 is formed downstream of the reading conveying path R2. The reverse conveying path R3 is used at the time of reversing upward the original document that has been read and discharging it. The reverse conveying path R3 is an original-document conveying path provided downstream of the nipping position of the second transport roller pair 20, and is an original-document conveying path configured to reverse, in a curved manner, the original document conveyed in the obliquely downward direction as indicated by the long dashed double-short dashed line illustrated in FIG. 5, and to discharge it from a first discharge port 37 toward the obliquely upward direction.

When the device main body 2 is in the booklet reading posture illustrated in FIG. 6, a non-reverse conveying path R4 is formed downstream of the reading conveying path R2. The non-reverse conveying path R4 is used at the time of discharging the original document that has been read, without reversing it. The non-reverse conveying path R4 is an original-document conveying path provided downstream of the nipping position of the second transport roller pair 20, and is an original-document conveying path configured such that the original document conveyed in the obliquely downward direction of the reading conveying path R2 as indicated by the long dashed double-short dashed line illustrated in FIG. 6 is discharged directly without reversing it in a curved manner, from the second discharge port 38 in the obliquely downward direction.

Note that the second transport roller pair 20 functions as a discharge roller pair configured to discharge the original document from the non-reverse conveying path R4.

The reverse conveying path R3 and the non-reverse conveying path R4 are switched by using a flap 35 that is a flap member that constitutes a unit that switches conveying paths. The flap 35 is able to rotate with a flap rotary shaft 35a being the center, and rotates to couple the reverse conveying path R3 to the reading conveying path R2 or couple the non-reverse conveying path R4 to the reading conveying path R2. Coupling the reverse conveying path R3 to the reading conveying path R2 means bringing the reverse conveying path R3 into a state of being usable or bringing the non-reverse conveying path R4 into a state of being not usable. Similarly, coupling the non-reverse conveying path R4 to the reading conveying path R2 means bringing the non-reverse conveying path R4 into a state of being usable or bringing the reverse conveying path R3 into a state of being not usable.

When the device main body 2 is in the standard reading posture, that is, is in the first posture, the flap 35 blocks the non-reverse transport path R4 and opens the reverse transport path R3. In addition, when the device main body 2 is in the booklet reading posture, that is, is in the second posture, the flap 35 blocks the reverse transport path R3 and opens the non-reverse transport path R4.

In the present embodiment, the flap 35 is configured to rotate so as to be linked with the switch of postures of the device main body 2. In the present embodiment, a first solenoid 86 (see FIG. 12) is used as a configuration of rotating the flap 35 so as to be linked with the switch of postures of the device main body 2. The control section 80 (see FIG. 12) configured to perform various types of control is configured to detect a posture of the device main body 2 on a basis of a detection signal from a first posture detecting sensor 87 or a second posture detecting sensor 88, each of which will be described later, and on the basis of the detected posture, cause the first solenoid 86 to actuate to rotate the flap 35. Note that the means for rotating the flap 35 is not limited to the first solenoid 86, and it may be possible to use other actuator such as a motor or the like. Alternatively, the flap 35 may be configured so as to be linked with the posture of the device main body 2 to mechanically rotate. In addition, the transport-path switching means corresponding to the flap 35 may be provided at the main-body support portion 6, rather than at the device main body 2.

A third transport roller pair 24 and a fourth transport roller pair 28 are provided at the reverse conveying path R3.

The third transport roller pair 24 is comprised of a third driving roller 25 provided in the third unit 5, and a third driven roller 26 provided in the second unit 4. The third driven roller 26 is provided so as to be able to advance or retreat relative to the third driving roller 25, and is pressed toward the third driving roller 25 by a not-illustrated pressing member such as a coil spring. The third driving roller 25 is driven by the transport motor 50. The third driven roller 26 is a roller that rotates in a driven manner.

The fourth transport roller pair 28 is comprised of a fourth driving roller 29 provided in the third unit 5, and a fourth driven roller 30 provided in the second unit 4. The fourth driven roller 30 is provided so as to be able to advance or retreat relative to the fourth driving roller 29, and is pressed toward the fourth driving roller 29 by a not-illustrated pressing member such as a coil spring. The fourth driving roller 29 is driven by the transport motor 50. The fourth driven roller 30 is a roller that rotates in a driven manner.

The third driving roller 25, the third driven roller 26, the fourth driving roller 29, and the fourth driven roller 30 are provided such that the number of each of these rollers is two, and these two rollers are provided with the center position of the original document in the width direction being interposed between them (see FIGS. 3 and 18).

When the third unit 5 is closed relative to the second unit 4, the third driving roller 25 and the third driven roller 26 are brought into contact with each other and the fourth driving roller 29 and the fourth driven roller 30 are also brought into contact with each other. When the third unit 5 is opened relative to the second unit 4, the third driving roller 25 and the third driven roller 26 are spaced apart from each other and the fourth driving roller 29 and the fourth driven roller 30 are also spaced apart from each other.

The original document that is conveyed through the reverse conveying path R3 is discharged by the fourth transport roller pair 28 obliquely upward including a component of the −Y direction, and is supported in a sloped posture by an upper surface 4*a* of the second unit 4.

Next, the configuration used to rotate the device main body 2 will be described. In the present embodiment, the device main body 2 rotates by the power from a posture switching motor 40 (see FIGS. 7 to 10) under control of the control section 80, and switches postures.

The control section 80 controls the posture switching motor 40 on the basis of input information from an external device 100 coupled to the scanner 1, specifically, on the basis of types (rigidity) of the original document. Alternatively, the control section 80 controls the posture switching motor 40 on the basis of input information from the operation unit 7. For example, when the operation unit 7 includes a posture switching button, the posture switching motor 40 is driven when the posture switching button is depressed, to rotate the device main body 2.

Figure 7:
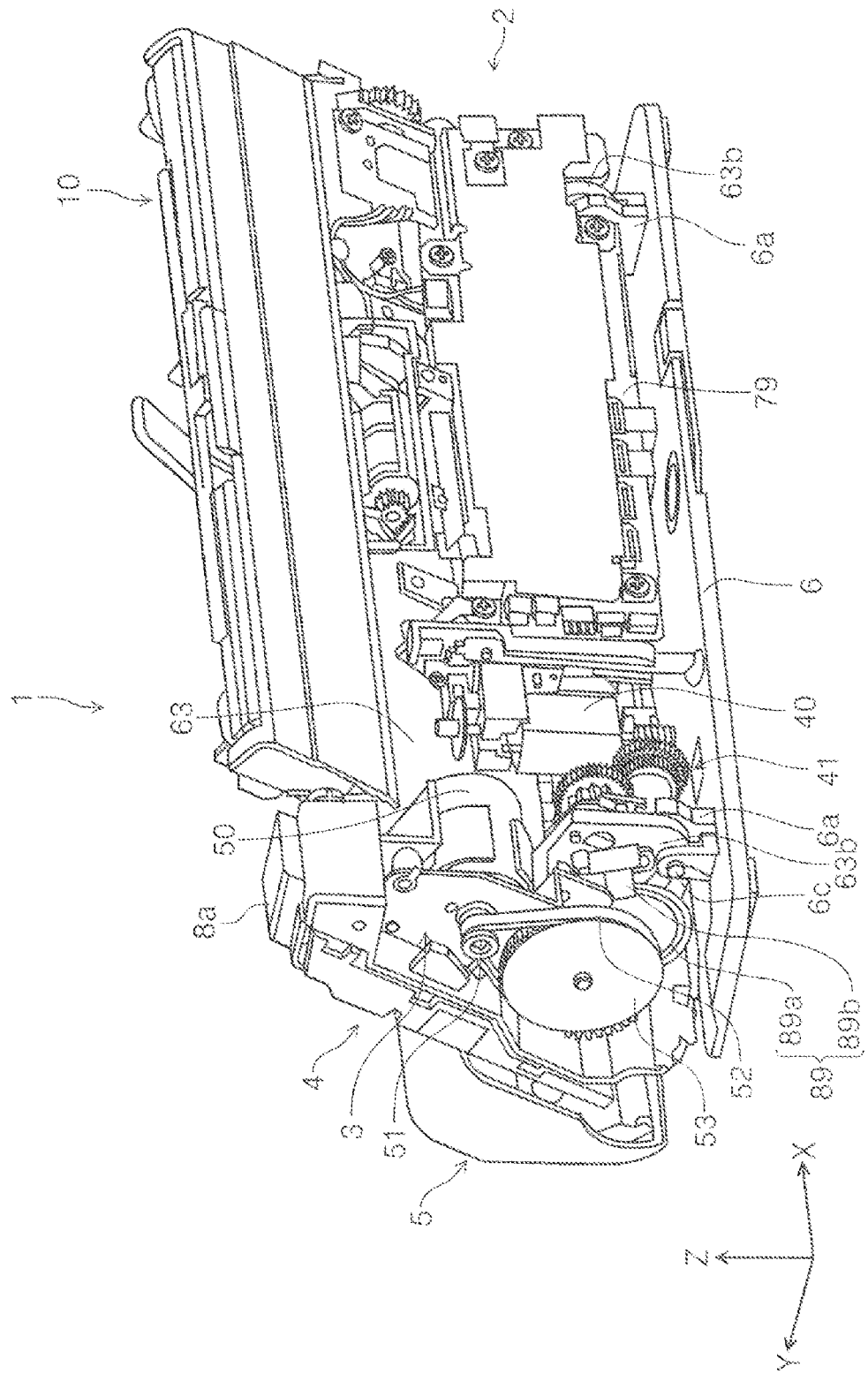
FIG. 7 is a perspective view illustrating the scanner from which a rear cover of a first unit is removed, as viewed from the back.

FIG. 7 illustrates a state where a rear cover 66 (see FIG. 2) that constitutes the external appearance of the back face of the device is removed. The reference character 41 represents a rotation conversion means configured to convert rotation of the posture switching motor 40 into rotation of the device main body 2. The posture switching motor 40 and the rotation conversion means 41 are provided more toward the side surface at the −X direction in the width direction of the device. The "more toward the side surface at the −X direction in the width direction of the device" means a position that is disposed more toward the −X direction than the center position, in the X-axis direction, of the device.

Two supported portions 63*b* are provided at the first frame 63 that constitutes the base body of the first unit 3, so as to be spaced apart from each other in the X-axis direction. Two main-body rotary shafts 6*c* are provided at the main-body support portion 6 so as to be spaced apart from each other in the X-axis direction. The main-body rotary shaft 6*c* penetrates through the supported portion 63*b*. This makes the first frame 63, that is, the device main body 2 rotatable with the main-body rotary shaft 6*c* being the center. The main-body rotary shaft 6*c* is a rotary shaft that constitutes the rotary shaft center parallel to the X-axis direction.

The posture switching motor 40 is provided at the first frame 63. The posture switching motor 40 is provided at the back face side of the first frame 63 provided in a sloped posture.

Figure 8:
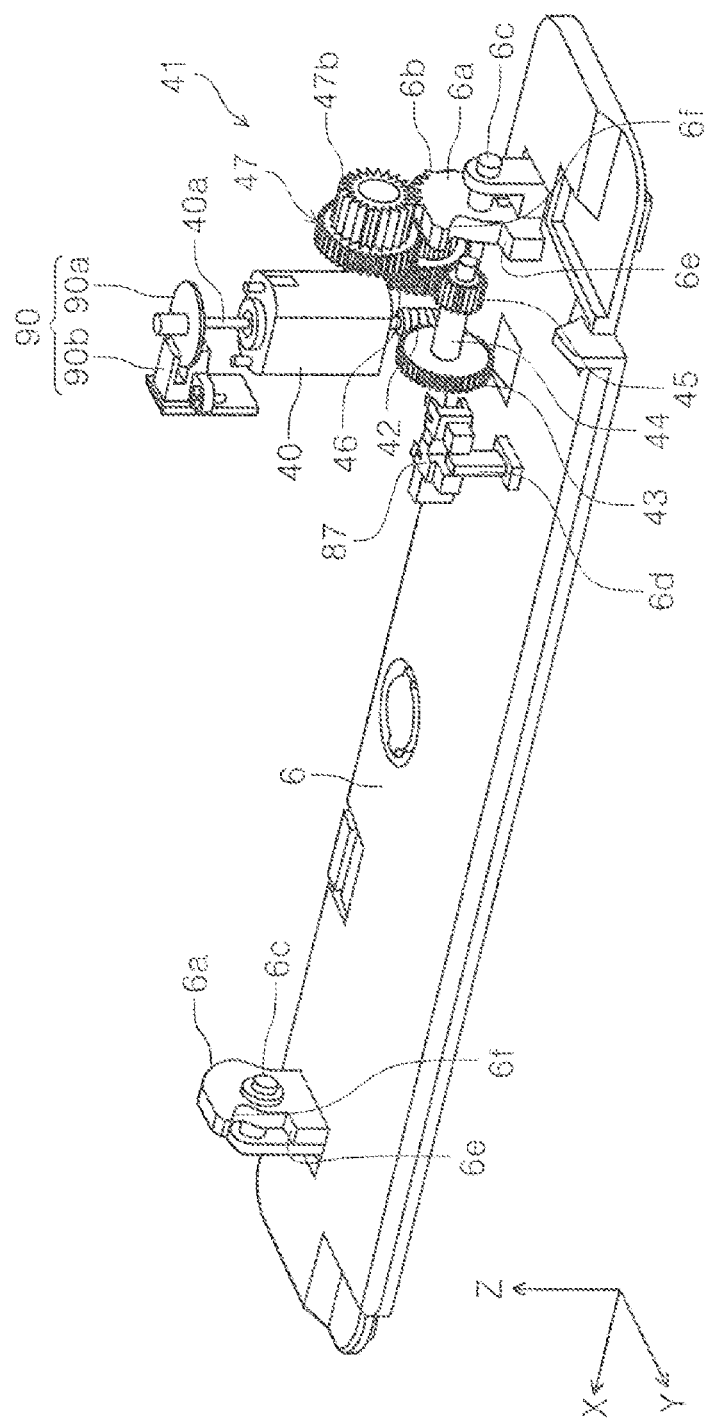
FIG. 8 is a perspective view illustrating configurations of a posture switching motor and a rotation conversion means.
Figure 9:
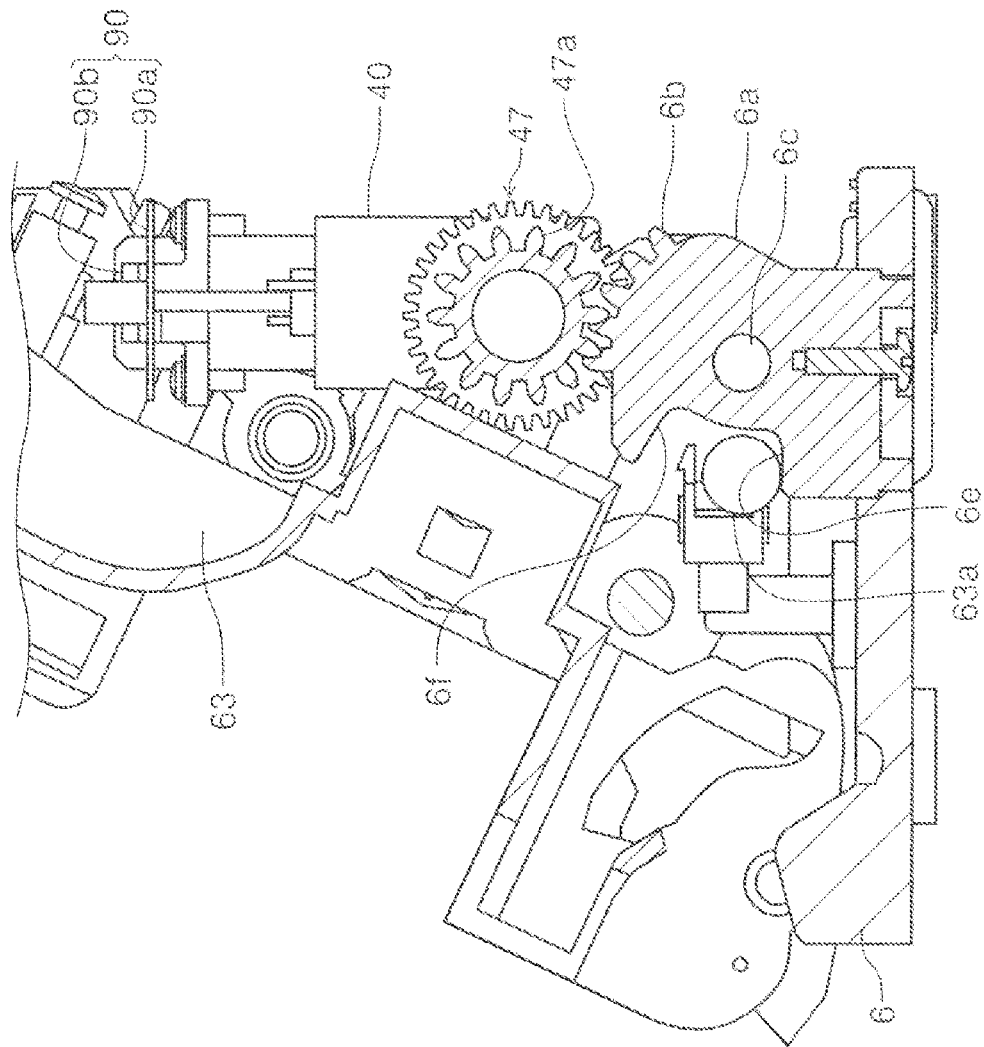
FIG. 9 is a cross-sectional view illustrating configurations of the posture switching motor and the rotation conversion means when the device main body is in a standard reading posture, as viewed from the width direction.
Figure 10:
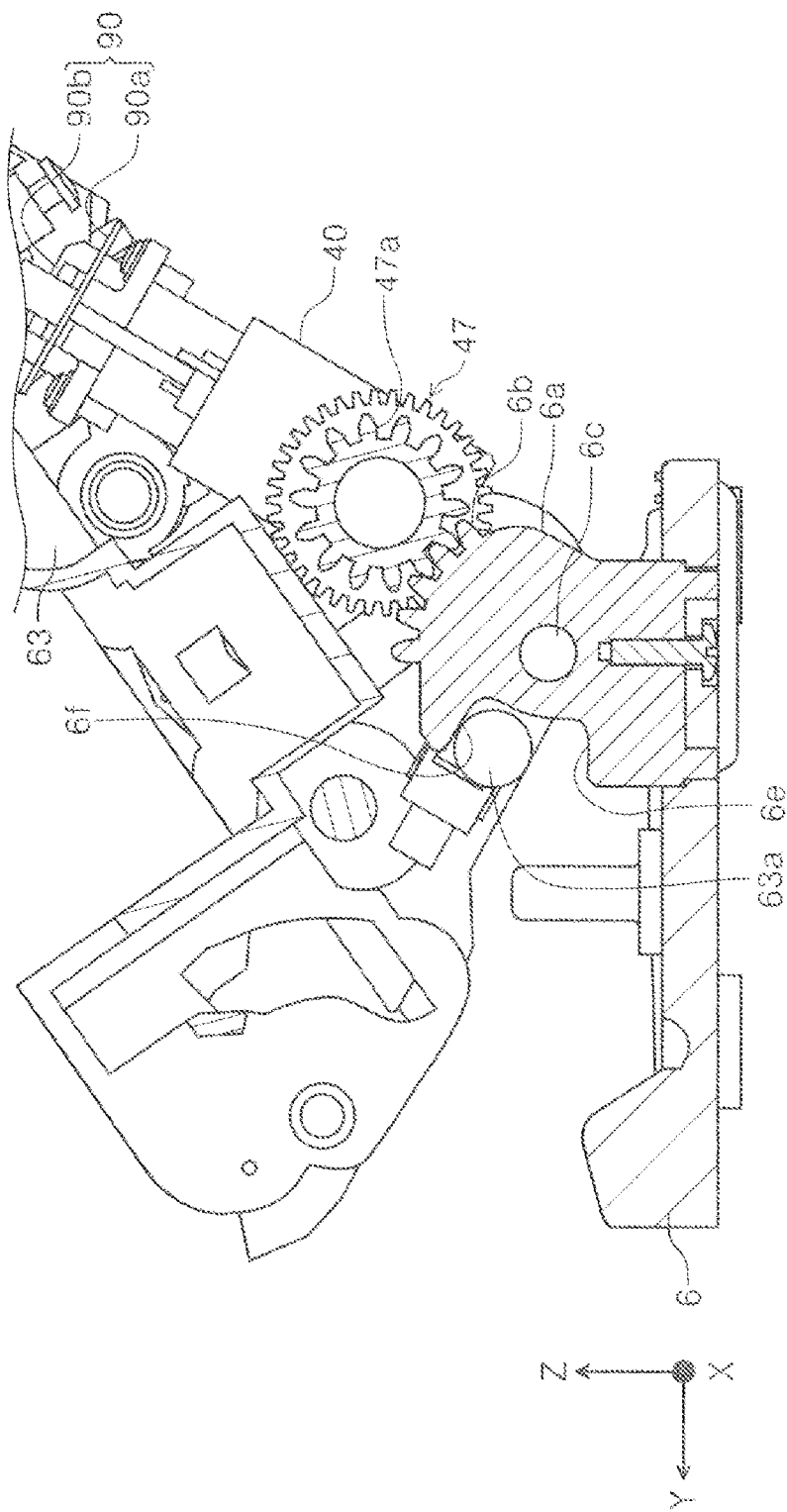
FIG. 10 is a cross-sectional view illustrating configurations of the posture switching motor and the rotation conversion means when the device main body is in a booklet reading posture, as viewed from the width direction.

In FIG. 8, the rotation conversion means 41 is a toothed gear provided rotatably at the first unit 3, and includes a toothed gear 47*b* configured to rotate by power from the posture switching motor 40, and teeth 6*b* fixed at the main-body support portion 6 and meshing with the toothed gear 47*b*.

The teeth 6*b* are teeth formed around the main-body rotary shaft 6*c* at a standing wall portion 6*a*. The standing wall portion 6*a* is a member that constitutes the main-body support portion 6.

More specifically, a worm gear 42 is provided at the rotary shaft of the posture switching motor 40, and the power is transmitted from the worm gear 42 to the toothed gear 43. The toothed gear 43 is formed integrally with the toothed gear 45 through a shaft 44. The toothed gear 45 transmits the power to the first combination toothed gear 46. The first combination toothed gear 46 transmits the power to the second combination toothed gear 47. The toothed gear 47*b* constitutes part of the second combination toothed gear 47.

The posture switching motor 40 and the configuration of the rotation conversion means 41 except for the configuration of the teeth 6*b* are provided at the first unit 3, that is, the device main body 2. Thus, when the toothed gear 47*b* rotates by the power from the posture switching motor 40, the device main body 2 rotates as illustrated by the transition from FIG. 9 to FIG. 10 or by the transition from FIG. 10 to FIG. 9, and the posture switches.

Note that the present embodiment employs a configuration in which the posture switching motor 40 and the configuration of the rotation conversion means 41 except for the configuration of the teeth 6*b* are provided at the first unit 3, that is, the device main body 2, and the teeth 6*b* are provided at the main-body support portion 6. However, in place of this configuration, it may be possible to employ a configuration in which the posture switching motor 40 and the configuration of the rotation conversion means 41 except for the configuration of the teeth 6*b* are provided at the main-body support portion 6, and the teeth 6*b* are provided at the device main body 2.

Note that a first contact portion 6*e* serving as a first rotation restricting means and a second contact portion 6*f* serving as a second rotation restricting means are formed at the standing wall portion 6*a*. A boss 63*a* provided at the first frame 63 enters a portion between the first contact portion 6*e* and the second contact portion 6*f*. When the device main body 2 rotates from the booklet reading posture illustrated in FIG. 10 toward the standard reading posture illustrated in FIG. 9, the boss 63*a* is brought into contact with the first contact portion 6*e* to define the standard reading posture of the device main body 2. In addition, when the device main body 2 rotates from the standard reading posture illustrated in FIG. 9 toward the booklet reading posture illustrated in FIG. 10, the boss 63*a* is brought into contact with the second contact portion 6*f* to define the booklet reading posture of the device main body 2.

When the boss 63*a* is brought into contact with the first contact portion 6*e* or when the boss 63*a* is brought into contact with the second contact portion 6*f*, the value of the driving electric current of the posture switching motor 40 increases. Thus, the control section 80 (see FIG. 12) is able to detect the posture of the device main device 2 on the basis of the rotational direction of and an increase in the value of the driving electric current of the posture switching motor 40. However, in the present embodiment, a first posture detecting sensor 87 and a second posture detecting sensor 88 are provided. This enables the control section 80 to detect the posture of the device main body 2 on the basis of detection signals of these sensors.

Note that, by supplying electrical power to the posture switching motor 40 that is at rest, the standard reading posture and the booklet reading posture of the device main body 2 are brought into a hold state, thereby being retained.

The first posture detecting sensor 87 is an optical sensor, and is provided at the first frame 63, that is, the device main body 2. When the device main body 2 is in the standard reading posture, a protrusion 6*d* provided at the main-body support portion 6 as illustrated in FIG. 8 blocks the optical axis of the first posture detecting sensor 87. In this state, when the device main body 2 rotates toward the booklet reading posture, the protrusion 6*d* is outside of the optical axis of the first posture detecting sensor 87.

Figure 11:
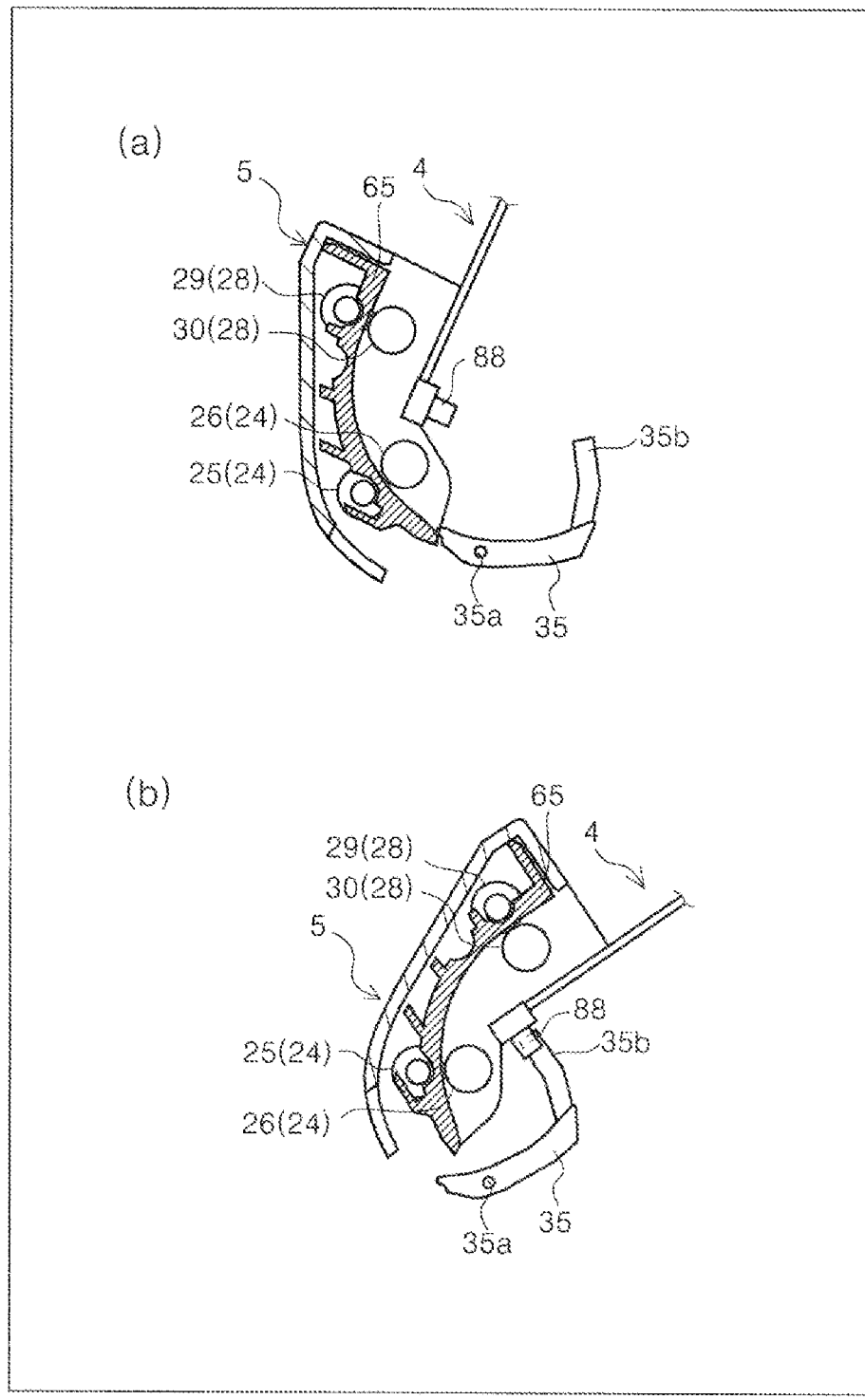
FIG. 11 is a diagram illustrating a second posture detecting sensor.

In addition, as illustrated in FIG. 11, the second posture detecting sensor 88 is provided at the second unit 4. A detection target 35b is formed at the flap 35. When the device main body 2 is in the standard reading posture, the detection target 35b deviates from the optical axis of the second posture detecting sensor 88 as illustrated in FIG. 11A. In this state, when the device main body 2 rotates toward the booklet reading posture, the detection target 35b blocks the optical axis of the second posture detecting sensor 88 as illustrated in FIG. 11B.

In this manner, the control section 80 is able to detect the posture of the device main body 2 on the basis of a detection signal of the first posture detecting sensor 87 and a detection signal of the second posture detecting sensor 88.

Next, the control system in the scanner 1 will be described with reference to FIG. 12.

The control section 80 serving as a control unit performs various types of control in the scanner 1, which include feeding, transporting, discharging, reading, or the like of the original document. A signal from the operation unit 7 is inputted into the control section 80.

The control section 80 controls the transport motor 50 and the posture switching motor 40. In the present embodiment, each of the motors is a DC motor.

Read data from the first reading unit 32 and the second reading unit 33 are inputted into the control section 80. In addition, a signal used to control each reading unit is transmitted from the control section 80 to each of the reading units.

The control section 80 also receives input of signals from the following detecting means: a mount detector 92, a multiple-feed detector 91, a first original-document detector 93, a second original-document detector 94, the first posture detecting sensor 87, the second posture detecting sensor 88, a first rotation detector 89, and a second rotation detector 90.

As illustrated in FIG. 7, the first rotation detector 89 is a detector provided at an end portion, in the −X direction, of the device main body 2. The control section 80 uses the first rotation detector 89 to detect the amount of rotation of the transport motor 50, thereby being able to obtain the amount of rotation of each roller provided in the original-document transport path.

The first rotation detector 89 is a rotary encoder including a rotary disk 89a and a detector 89b.

Note that, in FIG. 7, the reference character 51 represents a drive pulley provided at the rotary shaft of the transport motor 50. The reference character 53 represents a driven pulley. The reference character 52 represents an endless belt stretched around the drive pulley 51 and the driven pulley 53. The rotary disk 89a is provided at a not-illustrated rotating body driven through the driven pulley 53.

Furthermore, the second rotation detector 90 is a rotary encoder including the detector 89b and a rotary disk 90a provided at the rotary shaft 40a of the posture switching motor 40 as illustrated in FIG. 8. The control section 80 uses the second rotation detector 90 to detect the amount of rotation of the posture switching motor 40, thereby being able to obtain the rotational direction and the amount of rotation of the posture switching motor 40.

Returning to FIG. 12, the control section 80 includes a CPU 81, a flash ROM 82, and a RAM 83. The CPU 81 executes various types of computation processing in accordance with programs stored in the flash ROM 82 to control operation of the scanner 1 as a whole. The flash ROM 82 serving as one example of a storage means is a non-volatile readable and writable memory. Various types of information is temporarily stored in the RAM 83 serving as one example of a storage means.

An interface 84 included in the control section 80 is comprised of the first connection unit 71 and the second connection unit 72 that has been described with reference to FIG. 2. The control section 80 transmits and receives data with the external device 100 through this interface 84.

Next, each of the other detectors will be described.

The mount detector 92 is a detector provided upstream of the feed roller 14. The control section 80 is able to detect the presence or absence of the original document on the original-document support portion 11 on the basis of a signal transmitted from the mount detector 92.

The first original-document detector 93 is a detector provided between the feed roller 14 and the first transport roller pair 16. The control section 80 is able to detect that the leading edge or trailing edge of the original document passes through the detection position, on the basis of a signal transmitted from the first original-document detector 93.

The multiple-feed detector 91 is a detector provided between the feed roller 14 and the first transport roller pair 16, and includes an ultrasonic-wave transmission unit 91a and an ultrasonic-wave reception unit 91b that are disposed so as to be opposed to each other with the original-document feeding path R1 being interposed between them. The control section 80 is able to detect multiple feed of the original document on the basis of a signal transmitted from the multiple-feed detector 91.

The second original-document detector 94 is provided between the first transport roller pair 16 and the first reading unit 32 and the second reading unit 33. The control section 80 is able to detect that the leading edge or trailing edge of the original document passes through the detection position, on the basis of a signal transmitted from the second original-document detector 94.

Note that, in FIGS. 5 and 6, a triangle mark represents the detection position by each of the detector, and the reference character of each of the detectors is attached thereto.

Below, the multiple-feed detector 91 will be further described with reference to FIG. 13.

A transmission circuit 91c is coupled to the ultrasonic-wave transmission unit 91a. The transmission circuit 91c amplifies a pulse signal supplied from the control section 80 to supply the pulse signal in a form of ultrasonic wave to the ultrasonic-wave transmission unit 91a. This enables the ultrasonic-wave transmission unit 91a to send an ultrasonic wave having a predetermined frequency on the basis of the amplified pulse signal in the form of ultrasonic wave.

Note that the intensity of the ultrasonic wave sent by the ultrasonic-wave transmission unit 91a can be varied under the control of the control section 80. For example, the control section 80 varies a voltage applied to the ultrasonic-wave transmission unit 91a to vary the amplitude of the ultrasonic wave outputted from the ultrasonic-wave transmission unit 91a, thereby varying the intensity of the ultrasonic wave. Alternatively, the control section 80 varies the number of drive pulses of the ultrasonic-wave transmission unit 91a to vary the number of transmissions of the ultrasonic wave outputted by the ultrasonic-wave transmission unit 91a, thereby varying the intensity of the ultrasonic wave.

A reception circuit 91d is coupled to the ultrasonic-wave reception unit 91b. The reception circuit 91d is an amplifier circuit, and amplifies a detection signal outputted by the ultrasonic-wave reception unit 91b. An A-D converter 91e is coupled to the reception circuit 91d. The detection signal (analog signal) in the form of ultrasonic wave that has been amplified by the reception circuit 91d is converted into a digital signal to output it to the control section 80 as a voltage value. The digital signal outputted from the reception circuit 91d to the control section 80 serves as one example of a detection signal outputted in accordance with the ultrasonic wave received by the ultrasonic-wave reception unit 91b. Hereinafter, the intensity of this detection signal is referred to as a "detection intensity S".

Note that the reception circuit 91d has a multi-stage amplifier configuration in which a plurality of amplifiers are coupled in series to amplify the detection signal from the ultrasonic-wave reception unit 91b. In the present embodiment, four amplifiers A1, A2, A3, and A4 are coupled to each other in series.

Furthermore, the amplifier A4 at the final stage is coupled to the A-D converter 91e. In addition, the output from the amplifiers (A1, A2, and A3) at each of the stages is configured to be inputted into the A-D converter 91e. This configuration enables the control section 80 to obtain the output from the amplifiers at each of the stages as needed.

As the thickness of the original document increases, the detection intensity S reduces. In addition, as the density of the original document increases, the detection intensity S reduces. In other words, as the rigidity of the original document increases, the detection intensity S reduces. Thus, the detection intensity S serves as one example of information relating to rigidity of the original document, and the multiple-feed detector 91 serves as one example of a rigidity detecting unit configured to detect information relating to the rigidity of the original document.

Next, with reference to FIG. 14, description will be made of control performs by the control section 80 on the basis of the detection information from the multiple-feed detector 91.

When feeding the original document starts (step S101), the control section 80 detects a posture of the device main body 2. Then, when the posture of the device main body 2 is the booklet reading posture (No in step S102), the process proceeds to step S106 without performing step S103 (described later) and thereafter, and the original document is read. In this manner, when the device main body 2 is in the booklet reading posture, the control section 80 does not use the detection information from the multiple-feed detector 91, which makes it possible to simplify the control.

On the other hand, when the posture of the device main body 2 is the standard reading posture (Yes in step S102), the subsequent processes are performed. That is, when detection is made, on the basis of the detection information from the first original-document detector 93, that the leading edge of the original document passes through (Yes in step S103), determination is made as to whether or not the detection intensity S by the multiple-feed detector is less than or equal to a first threshold value (step S104).

Figure 15:
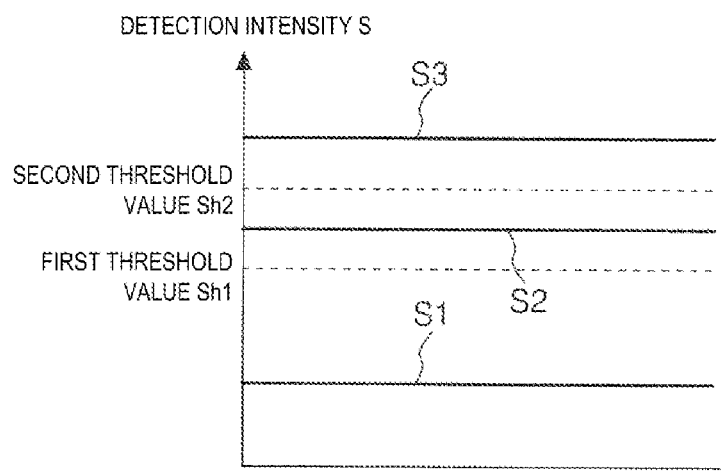
FIG. 15 is a diagram schematically illustrating a relationship between a detection intensity and threshold values of the multiple-feed detector.

The first threshold value is a threshold value used to determine whether or not a plurality of original documents are fed, and is denoted with the reference character Sh1 in FIG. 15, by way of example. The detection intensity S1 is one example of a case where the detection intensity is less than the first threshold value Sh1, and indicates that a plurality of original documents are fed. In this case (Yes in step S104), the control section 80 performs a predetermined process for multiple-feed error. For example, this predetermined process includes stopping feeding the original document and notification of occurrence of an error.

Next, the control section 80 determines whether or not the detection intensity S is less than or equal to a second threshold value (step S105). The second threshold value is denoted with the reference character Sh2 in FIG. 15, by way of example. The detection intensity S2 is one example of a case where the detection intensity is less than the second threshold value Sh2, and indicates that the original document has high rigidity and is less easily bent.

In the present embodiment, a second original document is an original document of which detection intensity S is greater than the first threshold value Sh1 and is less than or equal to the second threshold value Sh2. The detection intensity S greater than the first threshold value Sh1 and less than or equal to the second threshold value Sh2 is detection information corresponding to the second original document. The second original document is an original document that is not suitable to be transported through the reverse transport path R3, and is an original document that is suitable to be transported using the non-reverse transport path R4.

In the present example, the second original document is set as a sheet having a basis weight exceeding 127 (g/m2).

In contrast, in FIG. 15, the reference character S3 represents a case where the detection intensity S exceeds the second threshold value Sh2, by way of example. In the present embodiment, a first original document is an original document of which detection intensity S exceeds the second threshold value Sh2. The detection intensity S exceeding the second threshold value Sh2 is detection information corresponding to the first original document. The first original document is an original document that is suitable to be transported through the reverse transport path R3, and is an original document that is more easily bent.

In the present example, the first original document is set as a sheet having a basis weight less than or equal to 127 (g/m2).

In step S105, when the detection intensity S exceeds the second threshold value Sh2 (No in step S105), that is, in a case of the first original document, the process proceeds to step S106 to read the original document.

In step S105, when the detection intensity S is less than or equal to the second threshold value Sh2 (Yes in step S105), that is, in a case of the second original document, the control section 80 performs the following process. First, transporting the original document is stopped (step S107). Specifically, in the present example, driving the transport motor 50 (see FIG. 12) is stopped. With this process, all the rollers included in the device main body 2 stop.

Next, the control section 80 performs a returning operation for the original document (step S108). Specifically, in the present example, the transport motor 50 (see FIG. 12) is caused to drive in the reversed direction. With this process, all the rollers included in the device main body 2 rotate in the reverse direction to return the original document upstream.

In the present example, the control section 80 returns the original document to a position where the original document is not detected by the first original-document detector 93. With this process, the original document stops in a state where the leading edge of the original document is disposed between the feed roller 14 and the first original-document detector 93.

Next, the control section 80 causes the posture switching motor 40 (see FIG. 12) to be driven to switch the posture of the device main body 2 from the standard reading posture (FIG. 5) to the booklet reading posture (FIG. 6) (step S109).

Then, the control section 80 causes the first solenoid 86 (see FIG. 12) to be actuated to cause the flap 35 to rotate, thereby switching the transport path coupled to the reading transport path R2 from the reverse transport path R3 to the non-reverse transport path R4 (step S110).

After this, the control section 80 resumes feeding the original document (step S111). Note that, when feeding the original document is resumed, the type of the original document is already determined using the multiple-feed detector 91. Thus, it may be possible to skip the determination as to the type of the original document using the multiple-feed detector 91.

In this manner, when the control section 80 acquires detection information corresponding to the second original document from the multiple-feed detector 91 in a state where the device main body 2 is in the standard reading posture, the control section 80 performs a first step (step S107 in FIG. 14) of stopping transporting the original document and a second step (step S109 in FIG. 14) of controlling the posture switching motor 40 to switch the posture of the device main body 2 from the standard reading posture to the booklet reading posture.

By setting the device main body 2 to be in the booklet reading posture, the angle (angle α2 in FIG. 6) formed by the reading transport path R2 and the mounting surface G is smaller than that (angle α1 in FIG. 5) in the standard reading posture. This makes it possible to set the direction in which the original document is discharge to be in a direction along the mounting surface G. Thus, in the booklet reading posture, it is possible to appropriately discharge the original document that is less easily bent, that is, the second original document.

In addition, when the control section 80 acquires detection information corresponding to the second original document from the multiple-feed detector 91 in a state where the device main body 2 is in the standard reading posture, the control section 80 performs a first step of stopping transporting the original document and a second step of controlling the posture switching motor 40 to switch the posture of the device main body 2 from the standard reading posture to the booklet reading posture. This makes it possible to prevent a jam of the original document or breakage of the device in relation to transporting, in the standard reading posture, the second original document that is not suitable to be transported in the standard reading posture.

Furthermore, the posture of the device main body 2 is automatically switched into an appropriate posture. This makes it possible to improve usability.

In addition, in the present embodiment, on the basis of the type of the original document set by a user, the control section 80 switches the posture of the device main body 2. However, even when the actual type of the original document that is fed differs from the type of the original document set by the user, the posture of the device main body 2 is automatically switched into an appropriate posture as described above. This makes it possible to prevent a jam of the original document or breakage of the device.

Furthermore, the reading transport path R2 is coupled to the reverse transport path R3 when the device main body 2 takes the standard reading posture, and is coupled to the non-reverse transport path R4 when the device main body 2 takes the booklet reading posture. In the booklet reading posture, this makes it possible to appropriately discharge the original document that is less easily bent.

In addition, after performing the first step (step S107 in FIG. 14), the control section 80 performs the returning operation (step S108 in FIG. 14) in which the original document is returned upstream. With this configuration, it is possible to obtain the following operation and effect. That is, when transporting the original document is stopped and transporting the original document is resumed from this state, there is a possibility that the velocity at which the original document is transported does not reach an appropriate velocity at the reading position. This may lead to a deterioration in quality of reading. With the present embodiment, however, the control section 80 performs the first step and then performs the returning operation to return the original document upstream. This makes it possible to prevent the problem described above.

Furthermore, the device main body 2 includes the first original-document detector 93 disposed upstream of a detection position by the multiple-feed detector 91 in the original-document feeding path R1 and serving as an original-document detecting unit configured to detect the original document. The control section 80 returns, during the returning operation, the original document to a position where the first original-document detector 93 does not detect the original document (step S108 in FIG. 14). This makes it possible to reliably return the original document to an appropriate position.

Figure 14:
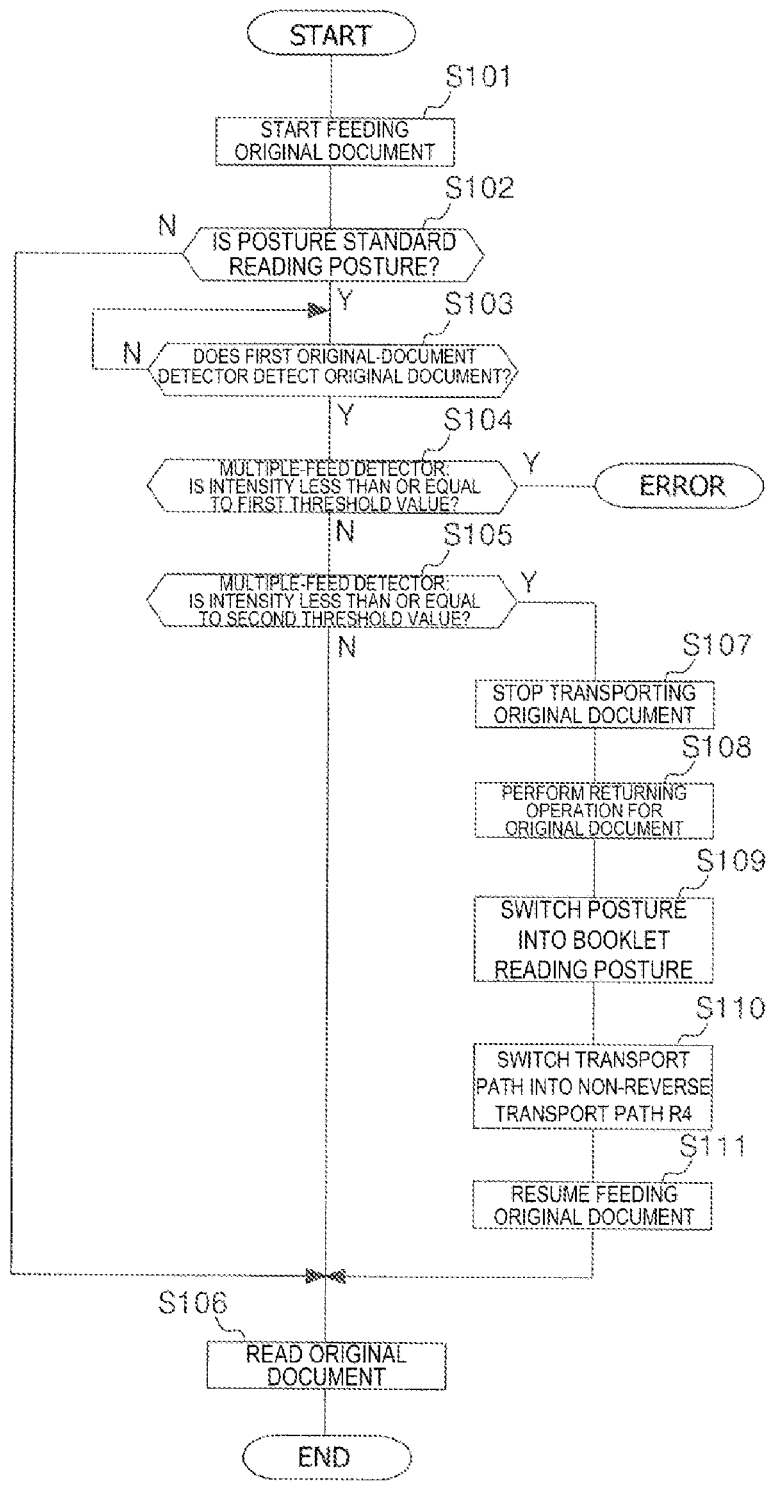
FIG. 14 is a flowchart showing a process performed according to postures of the device main body.

In addition, in the Example described above, after performing the second step (step S109 in FIG. 14), the control section 80 performs the operation of re-feeding the original document (step S111 in FIG. 14). This eliminates the need for a user to perform an operation of re-setting the original document, which makes it possible to improve usability.

It is possible to modify a portion of the Example that has been described above or make addition to the Example, on an as-necessary basis. This will be described below.

About Rigidity Detecting Unit

In the Example described above, the rigidity detecting unit is configured as the multiple-feed detector 91 that is an ultrasonic wave sensor. However, the rigidity detecting unit may be configured in the following manner.

For example, the rigidity detecting unit may be configured with an optical sensor including a light emitting unit configured to emit detection light toward the original document, and a light-receiving unit configured to receive the detection light passing through the original document. As the thickness of the original document increases, the intensity of the detection light detected by the light-receiving unit reduces. In addition, as the density of the original document increases, the intensity of the detection light detected by the light-receiving unit reduces. Thus, information relating to the intensity of the detection light detected by the light-receiving unit serves as one example of information relating to rigidity of the original document.

In addition, for example, as the thickness of the original document increases, the first upper roller 18, the second upper roller 22, and the second reading unit 33 are more largely retracted from the transport path for the original document. In this case, information relating to the amount of retract serves as one example of information relating to rigidity of the original document. Thus, the rigidity detecting unit may be configured with the means configured to detect the amount of retract, for example, with a range sensor configured to measure the distance from the first upper roller 18 or the second upper roller 22 or the second reading unit 33.

Furthermore, for example, as the amount of retract of the second reading unit 33 from the transport path for the original document increases, the luminance decreases at the background region disposed at the outside of the original document region in a read image. Information relating to the luminance serves as one example of information relating to rigidity of the original document. Thus, the rigidity detecting unit may be configured with the first reading unit 32 or the second reading unit 33.

In addition, for example, when the flap 35 is provided such that the flap 35 is able to rotate in a certain degree in a state illustrated in FIG. 5 and the reverse transport path R3 is retained by a pressing member such as a spring, as the rigidity of the original document increases, force that the flap 35 receives from the original document increases, and the amount of rotation of the flap 35 increases. Thus, information relating to the amount of rotation serves as one example of information relating to rigidity of the original document. For this reason, the rigidity detecting unit may be configured with a means configured to detect the amount of rotation. In this case, for example, the rigidity detecting unit may be configured with a switch or a sensor configured to be turned on and off in association with rotation of the flap 35, or with an encoder sensor configured to detect the amount of rotation of the flap 35.

Figure 16:
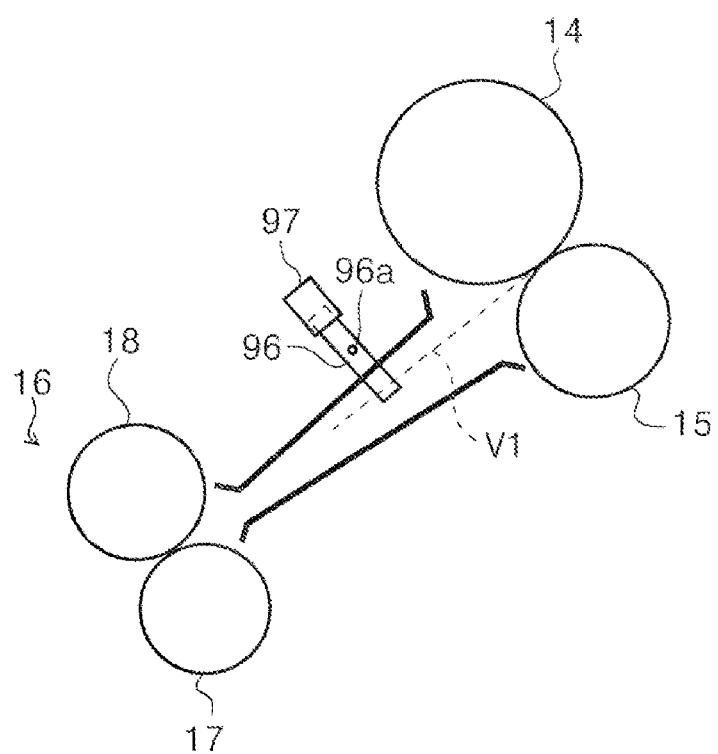
FIG. 16 is a diagram illustrating another embodiment of a rigidity detecting unit.

Similarly, in the configuration as illustrated in FIG. 16, it is possible to detect the rigidity of the original document, by using a difference between original documents in terms of how easy the original document is bent. In FIG. 16, the reference character 96 represents a detecting member having a lower end portion provided so as to protrude toward the original-document feeding path, and is provided so as to be able to rotate with a rotary shaft 96a being the center. The reference character 97 represents a sensor or a switch configured to detect the rotation of the detecting member 96. The detecting member 96 maintains the posture illustrated in FIG. 16 by the spring force. The reference character V1 represents a common tangent line at the nipping position between the feed roller 14 and the separation roller 15. When the original document is not fed, the detecting member 96 intersects the common tangent line V1.

In such a configuration, the first original document, in other words, an original document having low rigidity travels through the original-document feeding path so as not to be in contact with the detecting member 96 due to its own weight. On the other hand, the second original document, in other words, an original document having high rigidity is in contact with the detecting member 96 to rotate the detecting member 96. Thus, detection information from the sensor 97 serves as one example of information relating to rigidity of the original document. In addition, the detecting member 96 and the sensor 97 constitute the rigidity detecting unit.

Similarly, the control section 80 may include a rigidity detecting unit configured to detect the type (rigidity) of the original document on the basis of input information from the operation unit 7. In this case, the type of the original document inputted from the operation unit serves as one example of information relating to rigidity of the original document. For example, when the type of the original document inputted from the operation unit 7 is thick paper, a card, or a booklet, the control section 80 may determine that the rigidity of the original document is high, by using the rigidity detecting unit. In addition, when the type of the original document inputted from the operation unit 7 is thin paper or form paper, the control section 80 may determine that the rigidity of the original document is low, by using the rigidity detecting unit.

About Calibration of Multiple-Feed Detector

The detection intensity S by the ultrasonic wave sensor that constitutes the multiple-feed detector 91 varies due to environmental factors or the like such as temperatures or atmospheric pressures, and there is a possibility that the rigidity of the original document cannot be appropriately detected. Thus, it is preferable to perform calibration.

Calibration can be performed in the following manner, by way of example.

First, calibration can be performed at the time when the device is turned on in an environment where a user uses the device, or at the time of start of feeding in a state where the power supply is on.

Specifically, calibration is performed in the following manner, by way of example.

Figure 12:
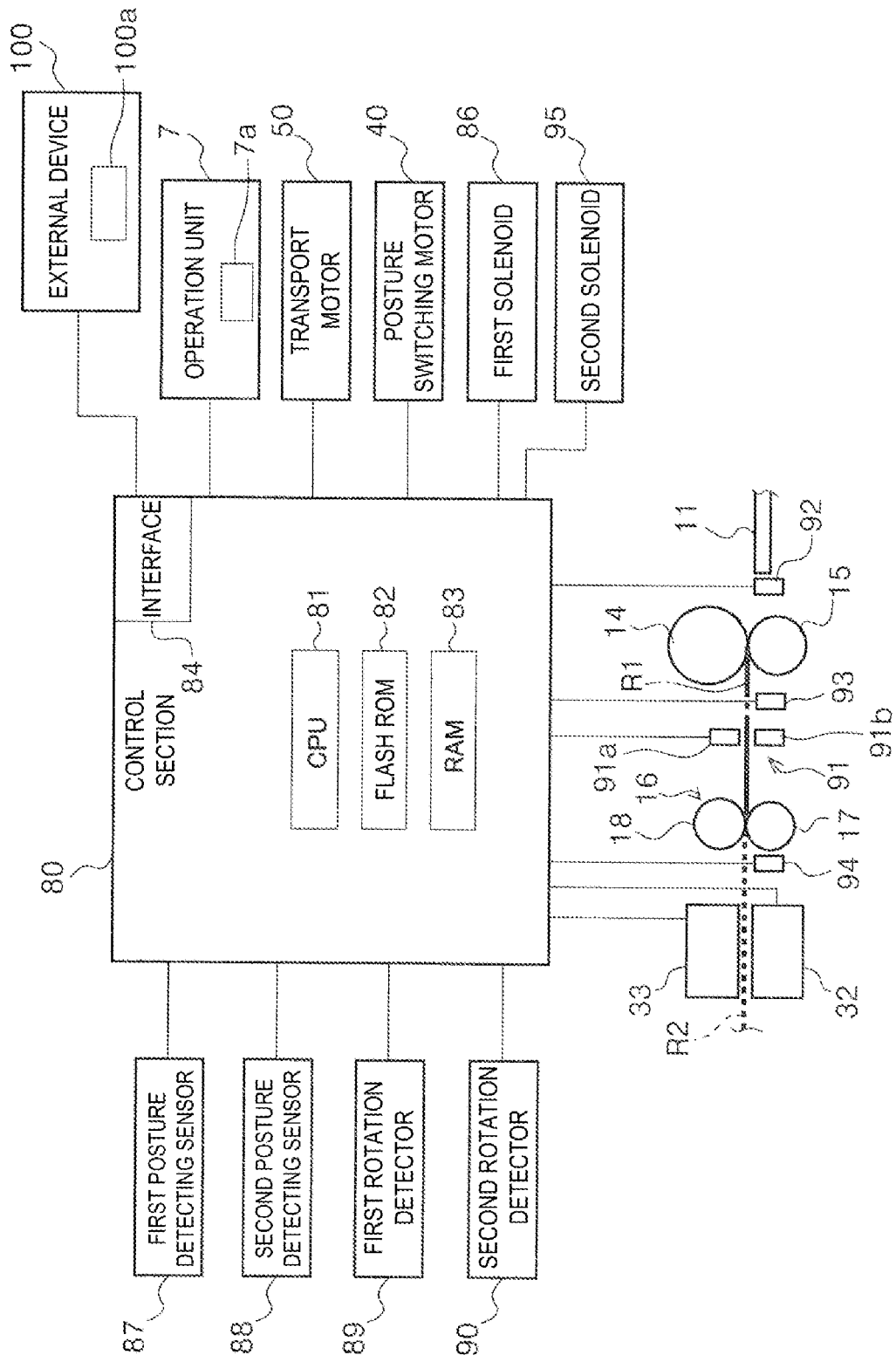
FIG. 12 is a block diagram illustrating a control system of the scanner.

First, a default threshold value (the first threshold value Sh1 and the second threshold value Sh2 in FIG. 15) is determined on the basis of a difference in the detection intensity between the first original document and the second original document, and is stored in a flash ROM (see FIG. 12).

Next, the detection intensity S for the first original document or the second original document used at the time of determining the individual threshold value described above is stored in the flash ROM (see FIG. 12) as a reference value. Hereinafter, description will be made on the assumption that the detection intensity S for the second original document is used as the reference value.

A correlation between the detection intensity S in a state where no original document exists and the detection intensity S for the second original document is acquired by sequentially varying the intensity of ultrasonic waves emitted by the ultrasonic-wave transmission unit 91a. A formula of this correlation is calculated, and is stored in the flash ROM (see FIG. 12). These are procedures performed in the device manufacturing step.

Next, the detection intensity S in a state where no original document exists at the time of calibration is measured in an environment where a user uses, and the detection intensity S for the second original document is estimated on the basis of the relationship formula described above.

After this, calculation is made as to a ratio between the estimated detection intensity S for the second original document and the reference value stored in the flash ROM (see FIG. 12), that is, the detection intensity S for the second original document acquired during the manufacturing step.

Then, the default threshold value is multiplied by the ratio described above to obtain a threshold value that is to be actually applied.

Note that calibration is not limited to the method described above. It may be possible to employ other known calibration methods.

About Adjustment of Detection Sensitivity of Multiple-Feed Detector

When a difference in the detection intensity S between the first original document and the second original document is small, there is a possibility that switching between the first original document and the second original document using the second threshold value Sh2 cannot be appropriately made. This happens in particular when the sensitivity is adjusted so that a difference in the detection intensity S between a case of multi-feed and a case of non-multi-feed is large in order to reliably detect multi-feeding of the original document.

Figure 13:
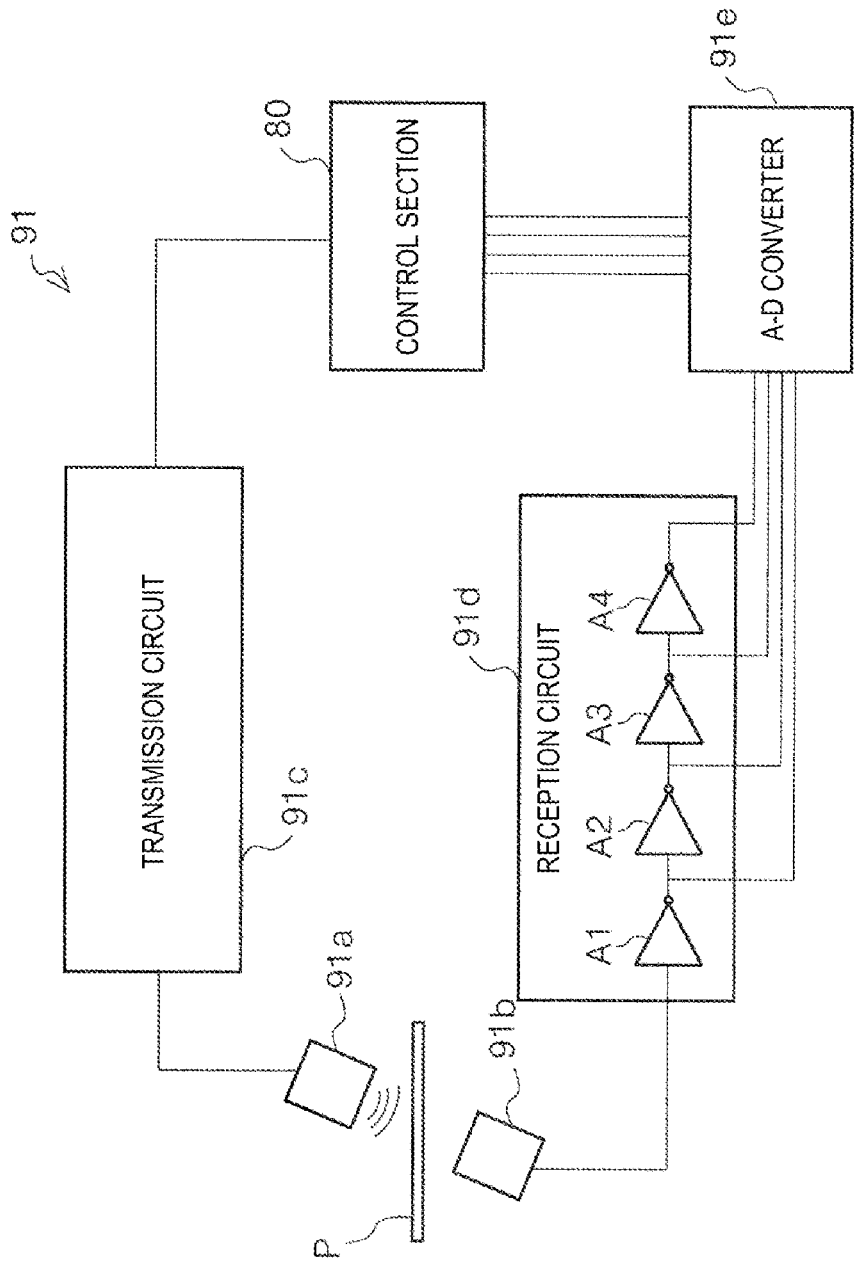
FIG. 13 is a block diagram illustrating the configuration of a multiple-feed detector.

In this case, for example, in FIG. 13, it is preferable to: provide a means configured to attenuate the reception level between the ultrasonic-wave reception unit 91b and the reception circuit 91d; or rather than the amplifier A4 at the final stage of the amplifiers included in the reception circuit 91d, use the output signal from the amplifier A3 or the amplifier A2 that is disposed at the stage before the amplifier A4; or weaken or strengthen the intensity of ultrasonic waves emitted by the ultrasonic-wave transmission unit 91a.

About Modification Example of Control Illustrated in FIG. 14

The control section 80 may perform, in parallel, step S108 in FIG. 14, that is, the returning operation for the original document and step S109, that is, the operation of switching the posture of the device main body 2. This makes it possible to reduce the period of time until feeding the original document is resumed.

In addition, when the scanner 1 includes a display unit 7a (see FIG. 12) configured to display various types of information, the control section 80 may cause the display unit 7a to perform display to indicate that the posture of the device main body 2 is to be switched, before performing step S109. Furthermore, it may be possible to cause a display unit 100a included in the external device 100 (FIG. 12) to perform similar display. Display indicating that the posture of the device main body 2 is to be switched may include, for example, displaying a message "Posture of the device is switching. Do you accept this? (OK/Cancel)" or the like. In response to this, when the OK button is clicked, it may be possible to perform steps S109 and S110.

By doing this process, it is possible to attract user's attention on switching of a posture of the device main body 2.

Note that, when "Cancel" is selected in the example described above, it is also preferable to display an alert indicating that the type of the original document is not suitable, and also to discharge the original document.

In addition, the display described above is basically performed before the posture of the device main body 2 is switched. However, it may be possible to perform display indicating that the device is switching the posture, during a time when the posture is being switched.

Furthermore, it may be possible to employ a configuration in which the control section 80 does not perform the returning operation (step S108) for the original document nor the operation (step S111) of resuming feeding the original document, and after performing steps S107, S109, and S110, the control section 80 transports downstream the original document that is in the middle of feeding, to perform the discharging operation.

This make it possible to avoid occurrence of a jam associated with returning the original document upstream.

In addition, in this case, it may be possible to cause the display unit 7a or the display unit 100a to display, for a user, an alert indicating that the type of the original document is not appropriate or a message that urges the user to re-set the original document.

Furthermore, in this case, due to operation performed by a user, there is a possibility that the posture of the device main body 2 is returned to the booklet reading posture or the standard reading posture. In this case, it may be possible to employ a configuration in which processes in and after step S102 are not performed, and once feeding the original document is started, reading the original document (step S106) is performed.

In addition, in the Example, re-feeding the original document is automatically perform (step S111). However, re-feeding the original document may be triggered by user's instruction, and be performed. For example, before step S111 is performed, it may be possible to cause the display unit 7a or the display unit 100a described above to display a message "Re-feeding the original document is performed. Do you accept this? (OK/Cancel)" or the like. Then, in response to this, when "OK" is selected, step S111 may be performed. Note that, when "Cancel" is selected in this case, it is also preferable to discharge the original document.

For example, it may be possible to omit step S109, that is, omit switching the posture of the device main body 2. That is, when the control section 80 acquires detection information corresponding to the second original document in a state where the transport path coupled to the reading transport path R2 is a transport path (reverse transport path R3) that is suitable for the first original document, the control section 80 switches the transport path coupled to the reading transport path R2 into a transport path (non-reverse transport path R4) that is suitable for the second original document. This makes it possible to prevent a jam of the original document or breakage of the device.

Note that, in this case, the posture of the device main body 2 may be any of the standard reading posture and the booklet reading posture. In addition, the device main body 2 may not be configured so as to be able to switch postures.

Furthermore, when the control section 80 acquires detection information corresponding to the first original document in a state where the transport path coupled to the reading transport path R2 is a transport path (non-reverse transport path R4) that is suitable for the second original document, the control section 80 may switch the transport path coupled to the reading transport path R2 into a transport path (reverse transport path R3) that is suitable for the first original document, or the transport path may not be switched and be left unchanged.

In the Example described above, the control section 80 returns the original document to a position where the first original-document detector 93 does not detect the original document during the returning operation for the original document (step S108). The configuration is not limited to this. It may be possible to return the original document to other positions. For example, it may be possible to rotate the transport motor 50 in the reverse direction by a predetermined amount to return the original document upstream.

In addition, in the Example described above, after performing the returning operation (step S108) for the original document, the control section 80 switches the posture of the device main body 2 (step S109). However, it may be possible to employ a configuration in which, after switching the posture of the device main body 2, the control section 80 performs the returning operation for the original document.

About Configuration in which Transport-Path Switching Means is not Provided

The scanner 1 is configured to use the flap 35 (transport-path switching means) to switch the original-document transport path coupled to the reading transport path R2. However, it may be possible to employ a configuration in which no transport-path switching means is provided.

Figure 17:
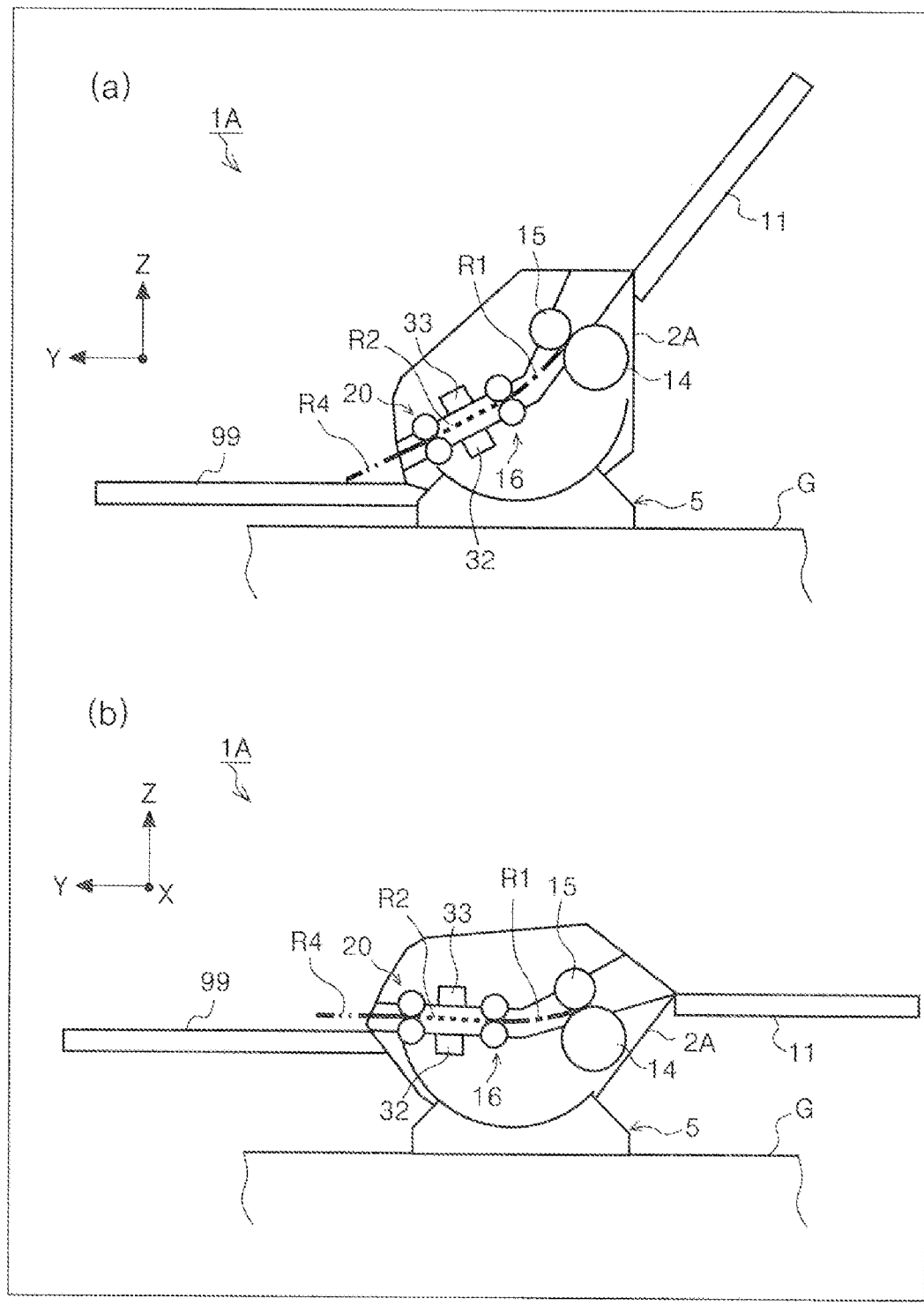
FIG. 17 is a diagram illustrating another embodiment of the scanner.

FIG. 17 illustrates a scanner 1A serving as one example of such a configuration. The same reference characters are attached to the same configurations as those in the embodiment described above, and explanation thereof will not be repeated.

Within the scanner 1A, the original-document transport path is fixed, and the non-reverse transport path R4 is coupled to the reading transport path R2. The original document discharged from the non-reverse transport path R4 is supported by a discharge tray 99.

A device main body 2A is configured to be able to switch the posture relative to the main-body support portion 6. The posture (angle) of the discharge tray 99 relative to the mounting surface G is configured so as not to change, or the rotation angle of the discharge tray 99 is configured to be smaller than the rotation angle of the device main body 2A.

FIG. 17A illustrates the standard reading posture, and a direction in which the original document is discharged is a direction intersecting the discharge tray 99. FIG. 17B illustrates the booklet reading posture. A direction in which the original document is discharged is a direction substantially parallel to the discharge tray 99. Alternatively, when intersecting the discharge tray 99, the direction in which the original document is discharged intersects the discharge tray 99 at a shallower angle than that in the standard reading posture. That is, the device main body 2 is able to switch between: the standard reading posture used when the first original document is discharge; and the booklet reading posture that is a posture in which the angle formed by the reading transport path R2 and the mounting surface G is smaller than that in the first posture, and is used when the second original document having rigidity higher than the first original document is discharged.

In such a configuration, when the control section 80 acquires detection information corresponding to the second original document from the rigidity detecting unit in a state in which the device main body 2A is in the standard reading posture, the control section 80 performs the first step of stopping transporting the original document and the second step of controlling the posture switching motor 40 to switch the posture of the device main body 2A from the standard reading posture to the booklet reading posture. This makes it possible to prevent a jam of the original document or breakage of the device.

In addition, the present disclosure is not limited to the Examples or modification examples described above. Various modifications are possible within the scope of the disclosure described in Claims, and it is needless to say that these should be included in the scope of the present disclosure.

What is claimed is:

1. An image reading device comprising:
   a main-body support portion mounted at a mounting surface of the device; and
   a device main body supported at the main-body support portion, wherein
   the device main body includes:
   a reading transport path that is an original-document transport path configured to transport an original document and is opposed to a reading unit configured to read the original document;
   a rigidity detecting unit configured to detect information relating to rigidity of the original document; and
   a control unit configured to control the device on a basis of detection information from the rigidity detecting unit,
   the device main body is attached rotatably relative to the main-body support portion and is configured to rotate by power of a driving source to switch a posture of the device main body,
   the device main body is configured to switch between a first posture and a second posture, the first posture being a posture in which a first original document is discharged, the second posture being a posture in which an angle formed by the reading transport path and the mounting surface is smaller than that in the first posture, the second posture being a posture in which a second original document having rigidity higher than the first original document is discharged, and
   when the device main body acquires detect information corresponding to the second original document from the rigidity detecting unit in a state where the device main body is in the first posture, the control unit performs a first step of stopping transporting the original document and a second step of controlling the driving source to switch the posture of the device main body from the first posture to the second posture.

2. The image reading device according to claim 1, wherein
   the device main body includes:
   a reverse transport path that is an original-document transport path disposed downstream of the reading transport path and used when the read original document is reversed to face upward and is discharged; and
   a non-reverse transport path that is an original-document transport path disposed downstream of the reading transport path and used when the read original document is discharged without being reversed, and
   the reading transport path is coupled to the reverse transport path when the device main body takes the first posture, and is coupled to the non-reverse transport path when the device main body takes the second posture.

3. The image reading device according to claim 1, wherein,
   after performing the first step, the control unit performs a returning operation to return the original document upstream.

4. The image reading device according to claim 3, wherein
   the device main body includes an original-document detecting unit disposed upstream of a detecting position by the rigidity detecting unit in an original-document transport path and configured to detect the original document, and
   the control unit returns, during the returning operation, the original document to a position where the original-document detecting unit does not detect the original document.

5. The image reading device according to claim 3, wherein
   the control unit performs the second step and the returning operation in parallel.

6. The image reading device according to claim 1, wherein,
   after performing the second step, the control unit performs an operation of re-feeding the original document.

7. The image reading device according to claim 1, wherein,
   after performing the second step, the control unit performs an operation of discharging the original document.

8. The image reading device according to claim 1, wherein,
   when the device main body is in the second posture, the control unit does not use detection information from the rigidity detecting unit.

9. The image reading device according to claim 1 comprising:
   a display unit configured to display a various type of information, wherein,
   before performing the second step, the control unit causes the display unit to perform display indicating that the posture of the device main body is to be switched.

* * * * *